United States Patent [19]
Ohtake

[11] Patent Number: 5,684,639
[45] Date of Patent: Nov. 4, 1997

[54] ZOOM LENS CAPABLE OF FOCUSING ON CLOSE RANGE

[75] Inventor: Motoyuki Ohtake, Kanagawa, Japan

[73] Assignee: Nikon Corporation, Tokyo, Japan

[21] Appl. No.: 580,844

[22] Filed: Dec. 29, 1995

[30] Foreign Application Priority Data

Jan. 12, 1995 [JP] Japan ................................. 7-019768

[51] Int. Cl.$^6$ ............................ G02B 15/22; G02B 15/14
[52] U.S. Cl. ..................... 359/693; 359/684; 359/687; 359/689
[58] Field of Search ............................ 359/684, 689, 359/688

[56] References Cited

U.S. PATENT DOCUMENTS

| | | | |
|---|---|---|---|
| 4,787,719 | 11/1988 | Imai | 359/684 |
| 5,185,678 | 2/1993 | Arimoto | 359/683 |
| 5,483,380 | 1/1996 | Nozawa | 359/686 |
| 5,499,141 | 3/1996 | Ohtake | 359/684 |
| 5,572,365 | 11/1996 | Ito | 359/677 |

Primary Examiner—Georgia Y. Epps
Assistant Examiner—John P. Cornelly
Attorney, Agent, or Firm—Oliff & Berridge

[57] ABSTRACT

A small zoom lens makes possible short distance focusing with a high zoom ratio and high performance using a simple lens barrel. A focusing second lens unit moves along the optical axis during focusing to the short distance object; a first lens unit is adjacent to and on the object side of the focusing lens unit; and a third lens unit is adjacent to and on the image side of the focusing lens unit. The second unit lens and the third lens unit move integrally together during zooming between a maximum wide-angle state and a maximum telephoto state. The focusing lens unit moves in conjunction with and relative to the second and third lens units. The first or the third lens unit has a positive focal length and the other has a negative focal length. Additionally, the first and third lens units satisfies the following condition:

$$-0.6 < (fa + fb)/(fa - fb) < 0.4$$

where
fa=focal length of the first lens unit, and
fb=focal length of the third lens unit.

24 Claims, 21 Drawing Sheets

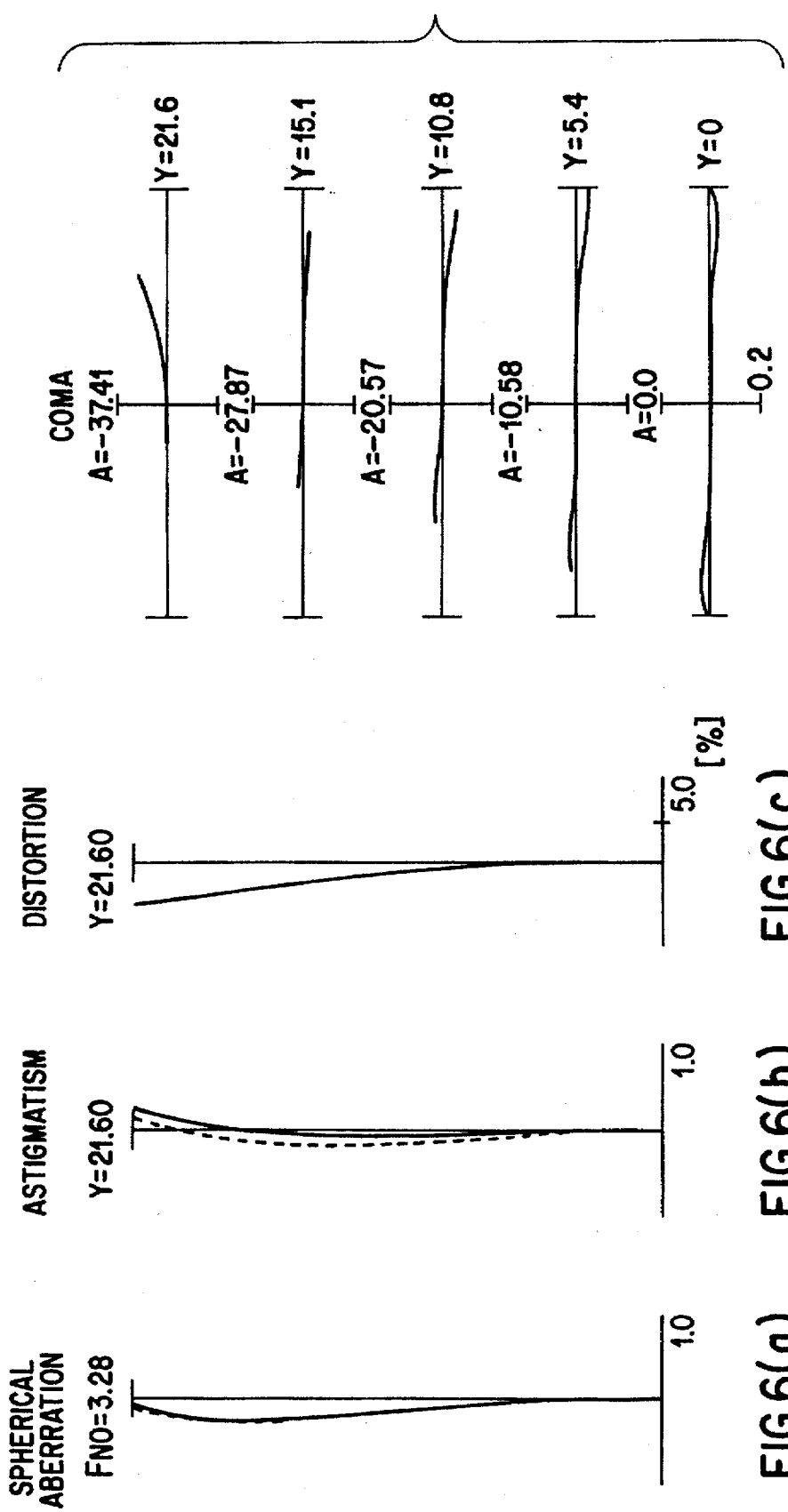

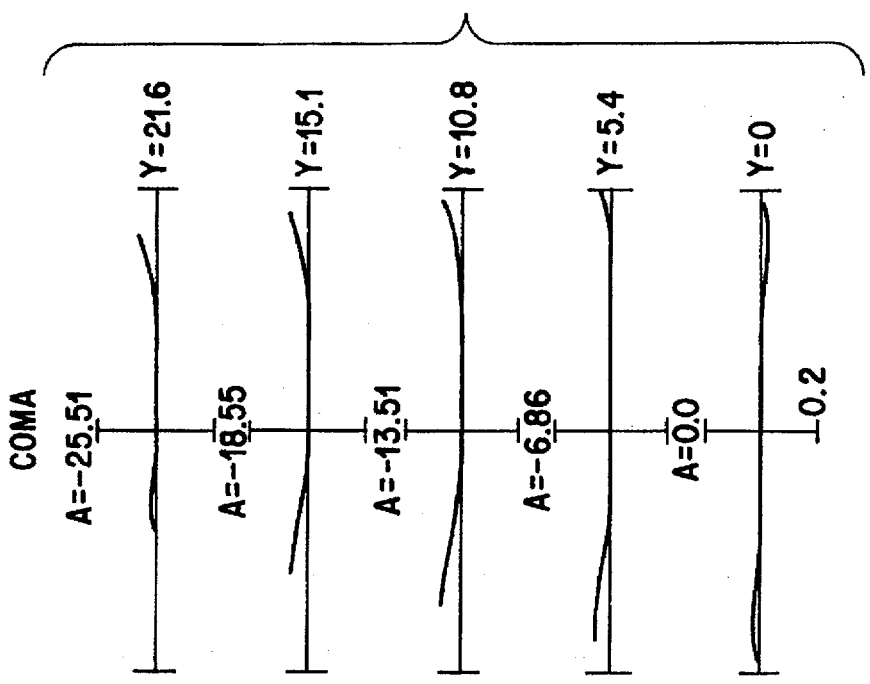
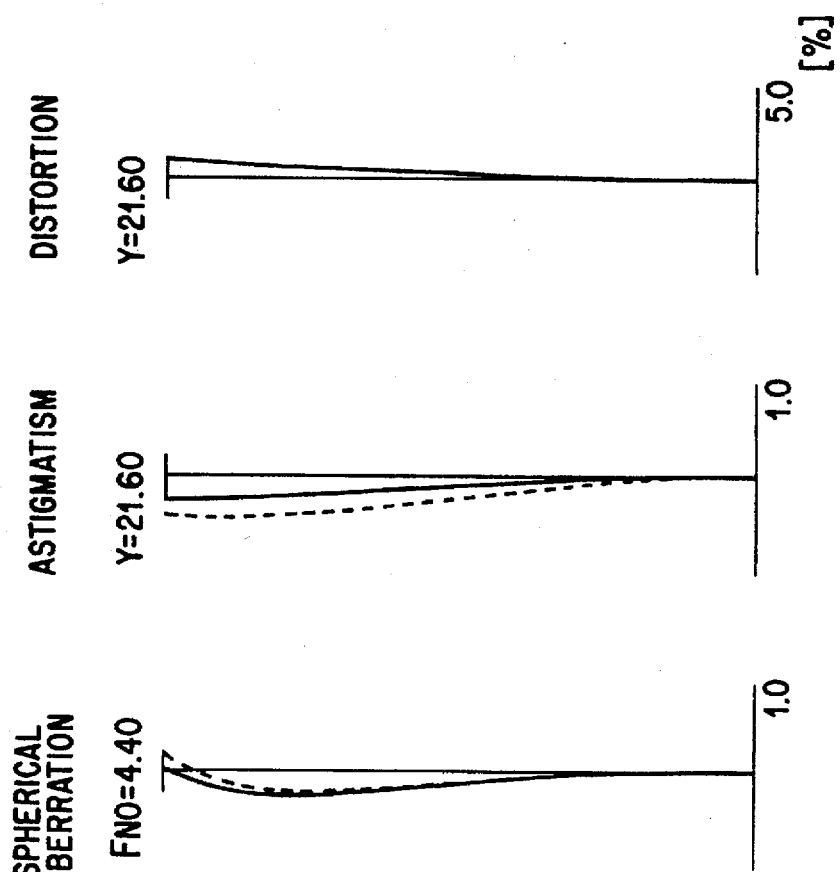
FIG.7(a) FIG.7(b) FIG.7(c) FIG.7(d)

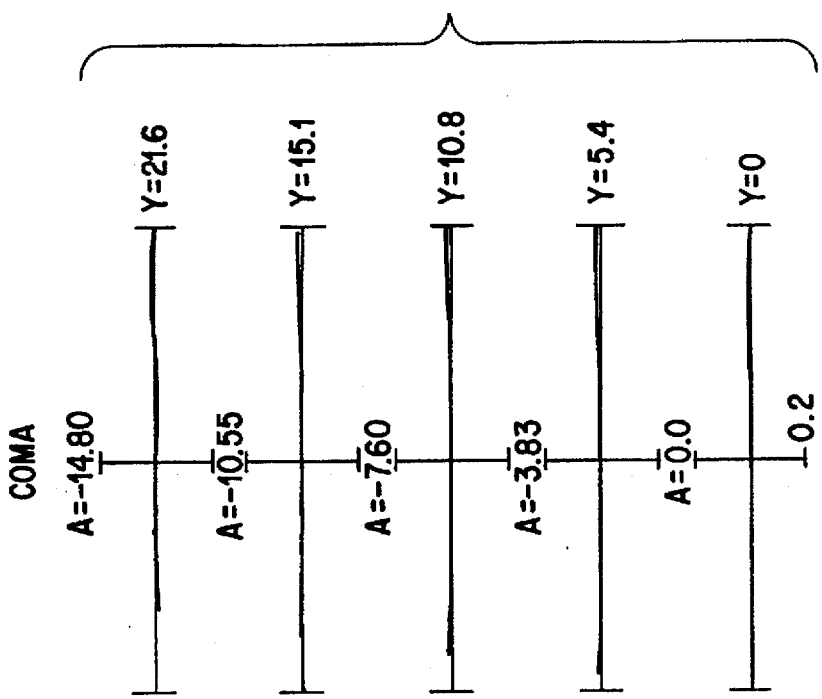
FIG.8(d)
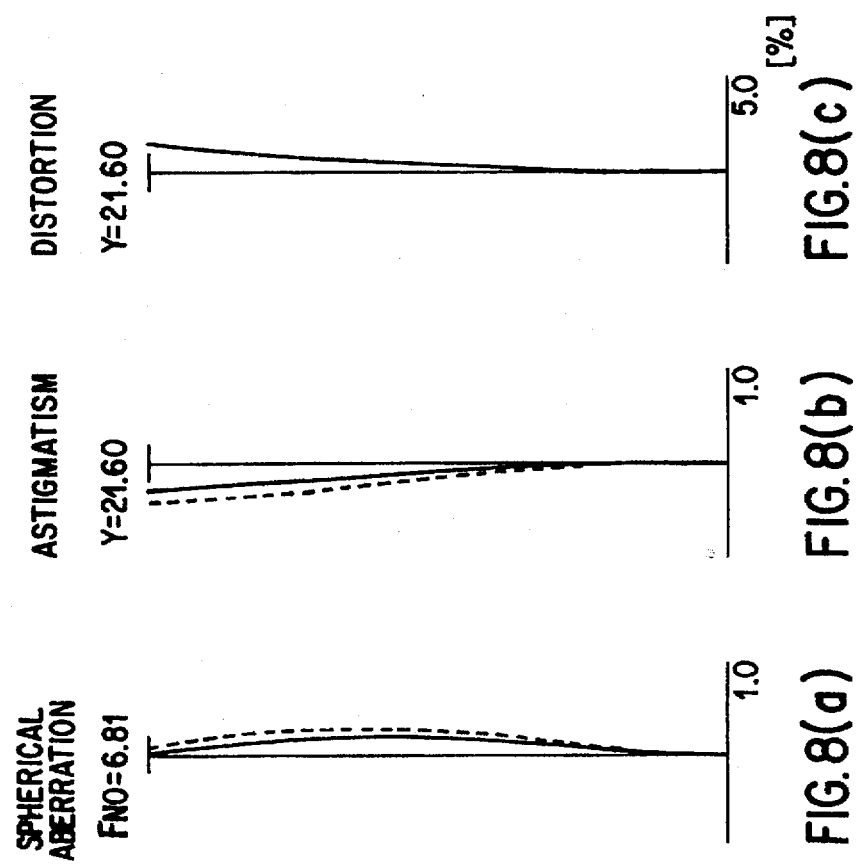
FIG.8(c)
FIG.8(b)
FIG.8(a)

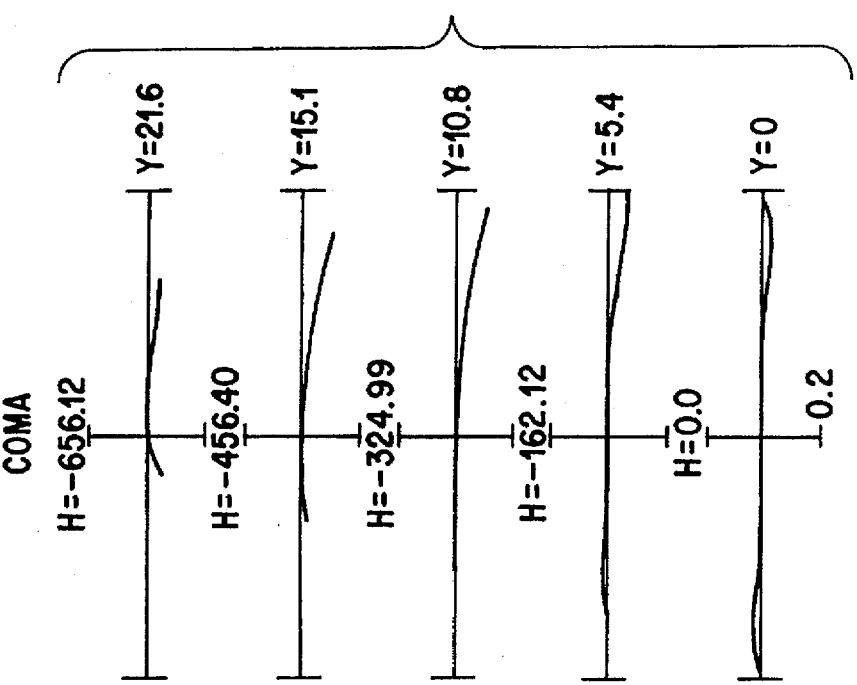
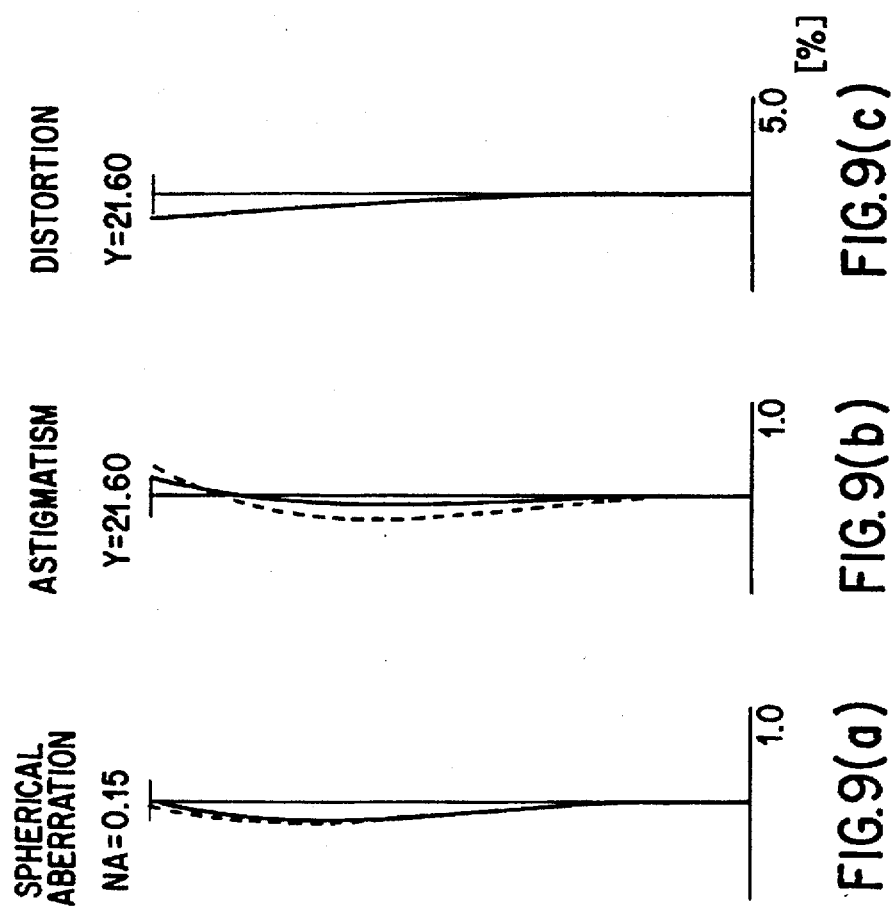

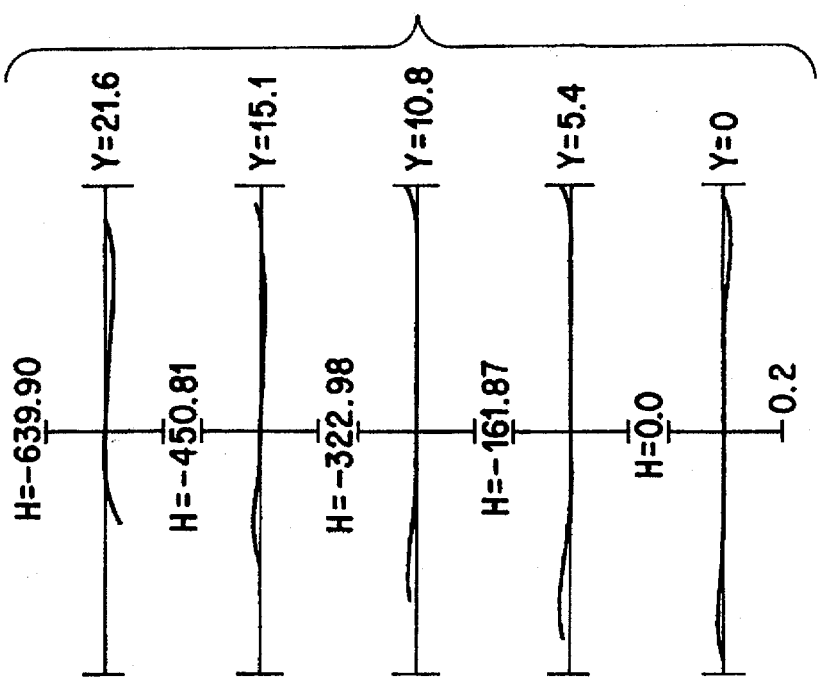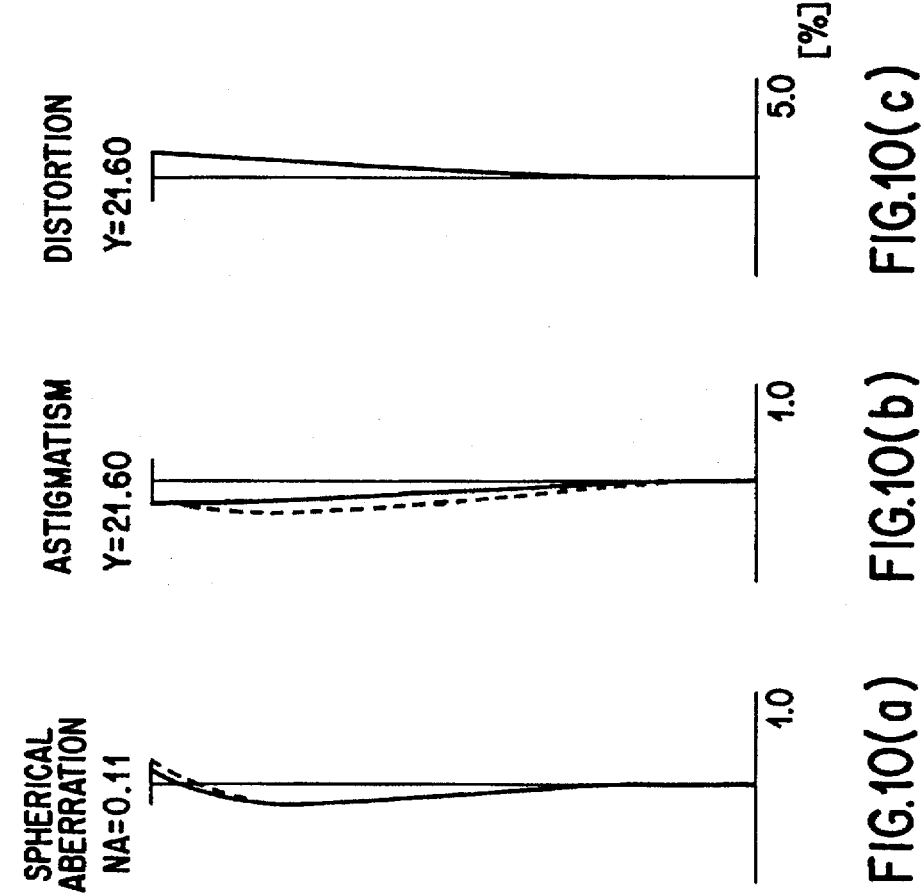

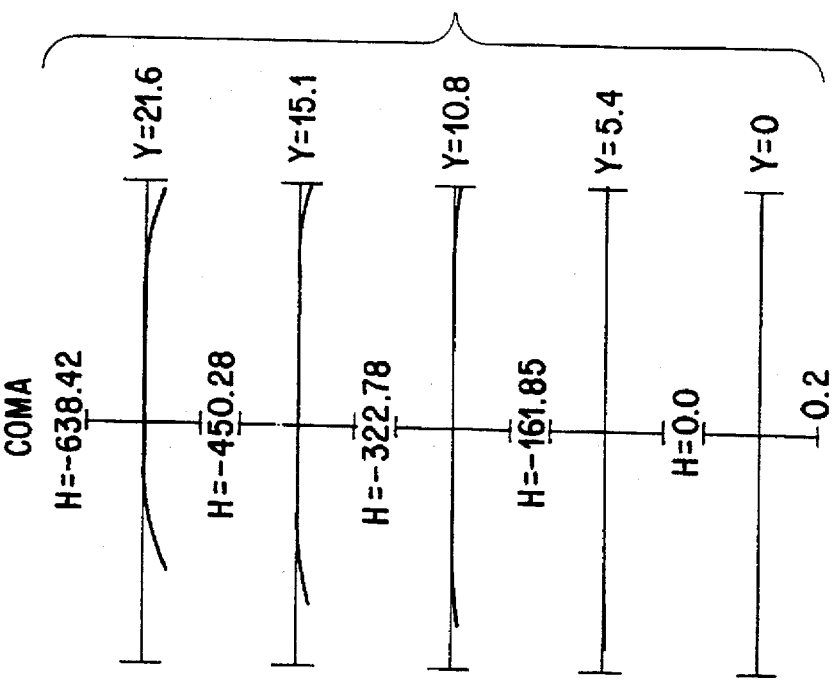
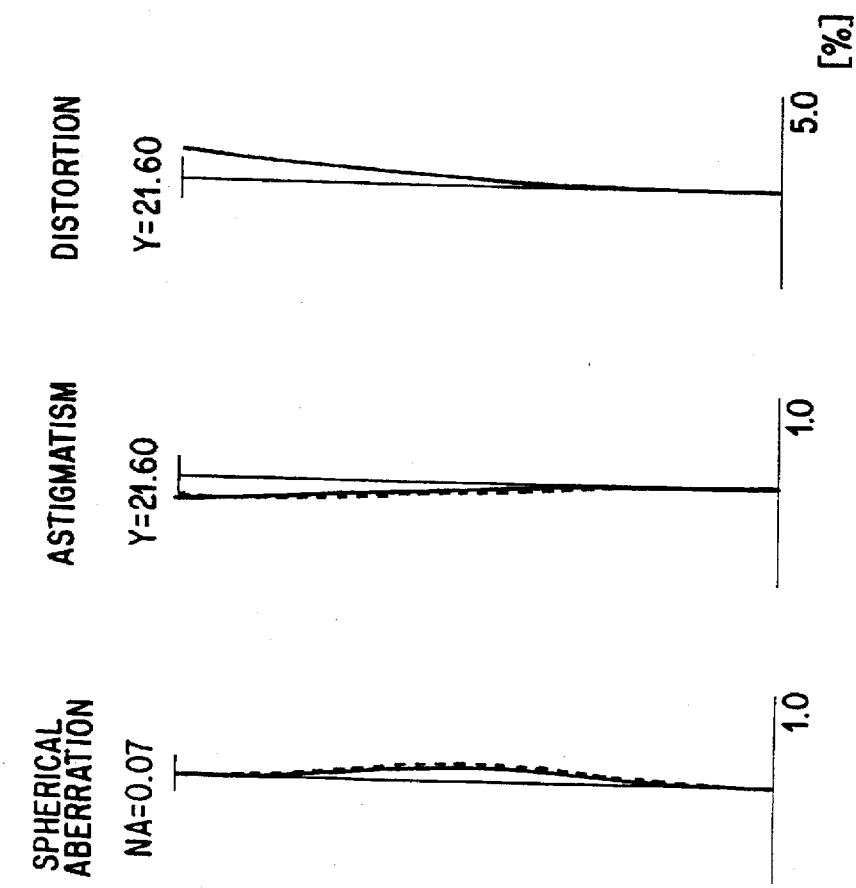

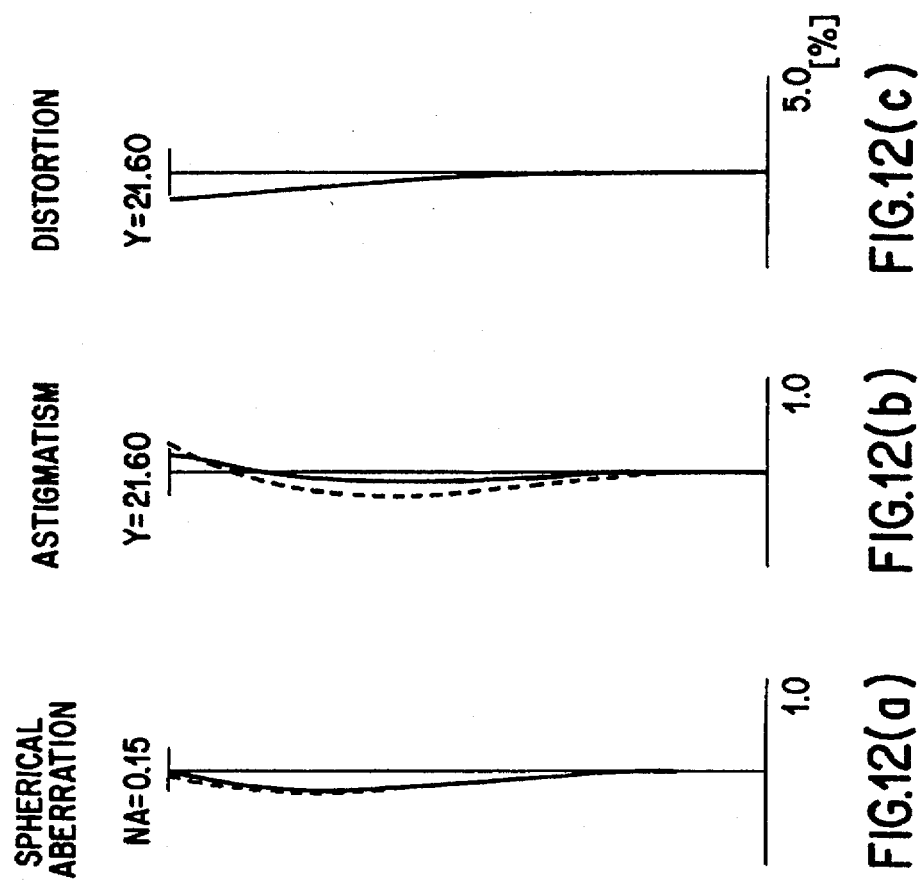
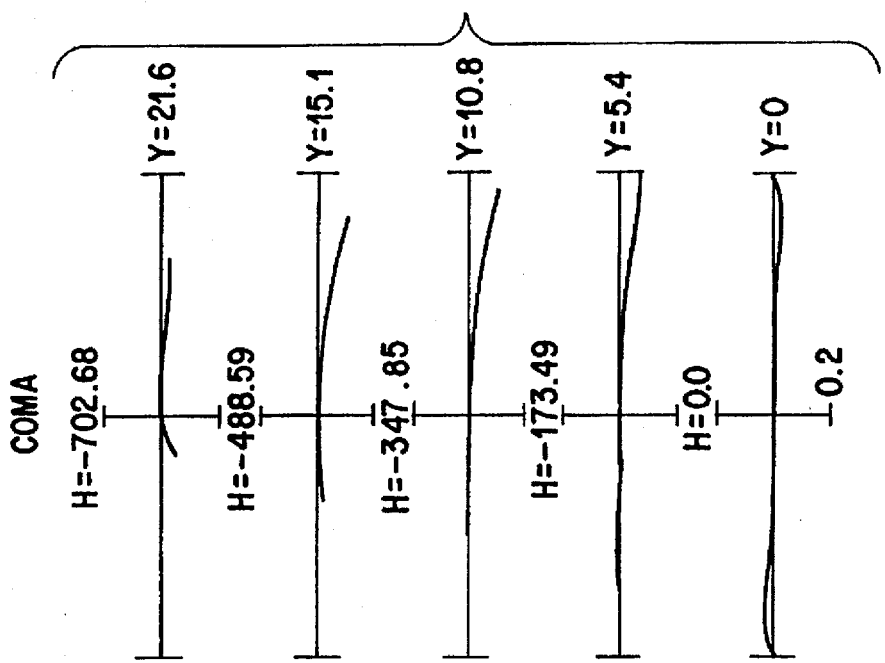

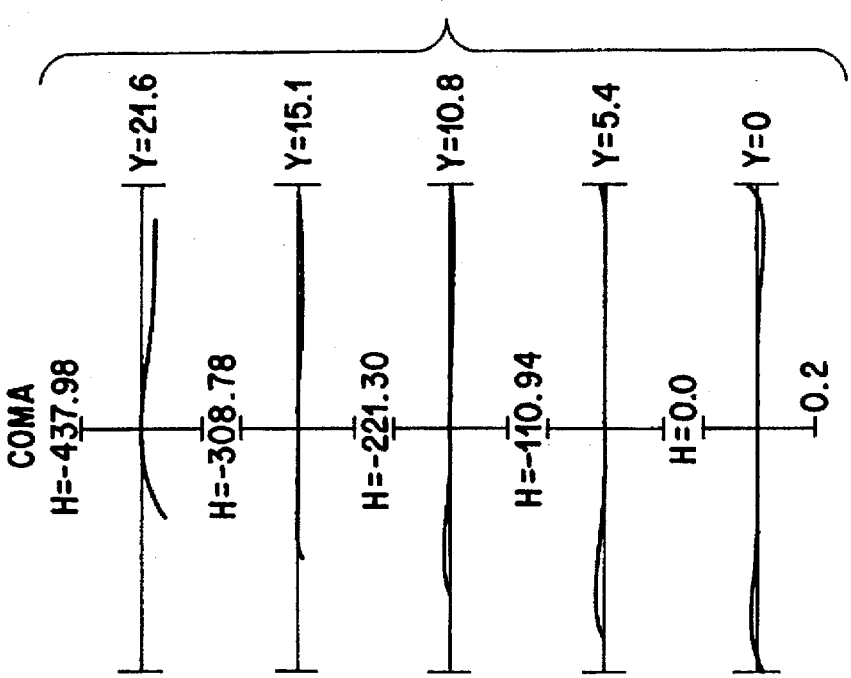
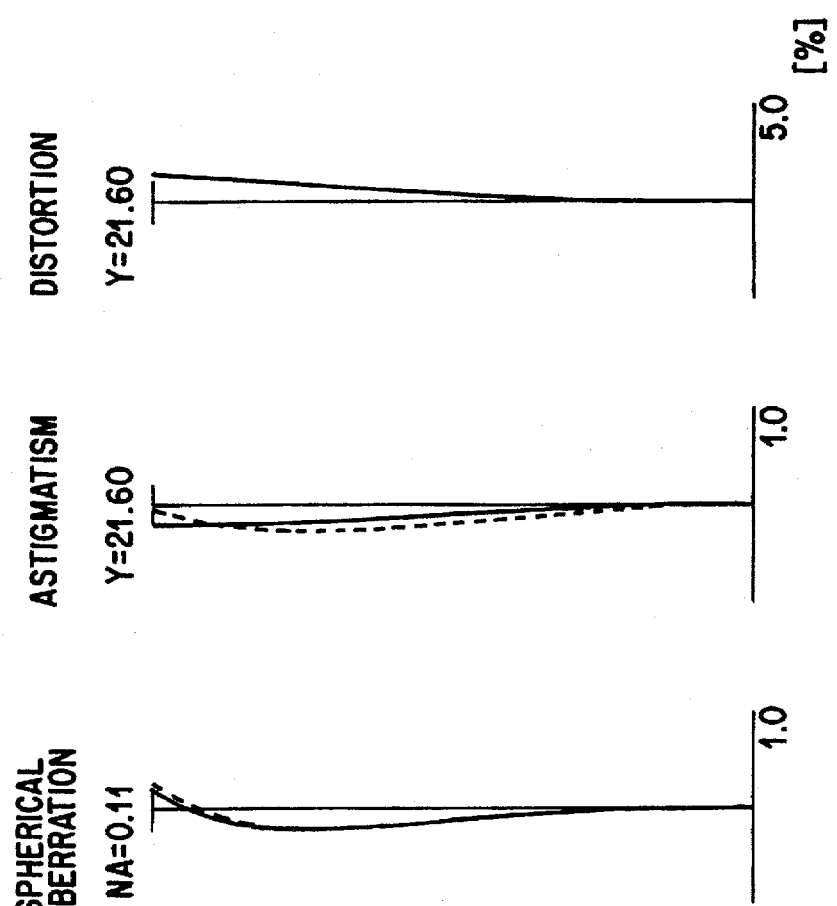

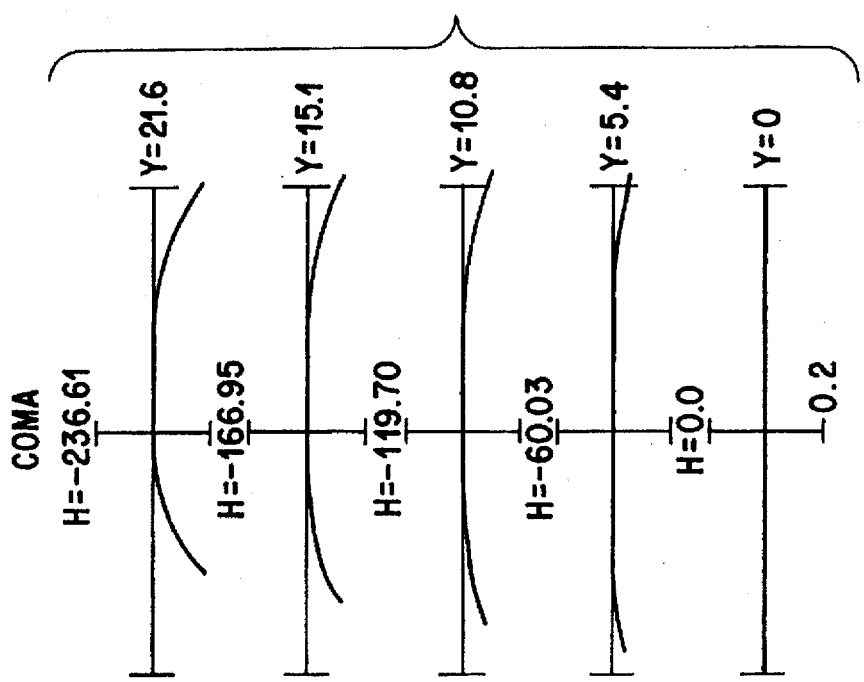
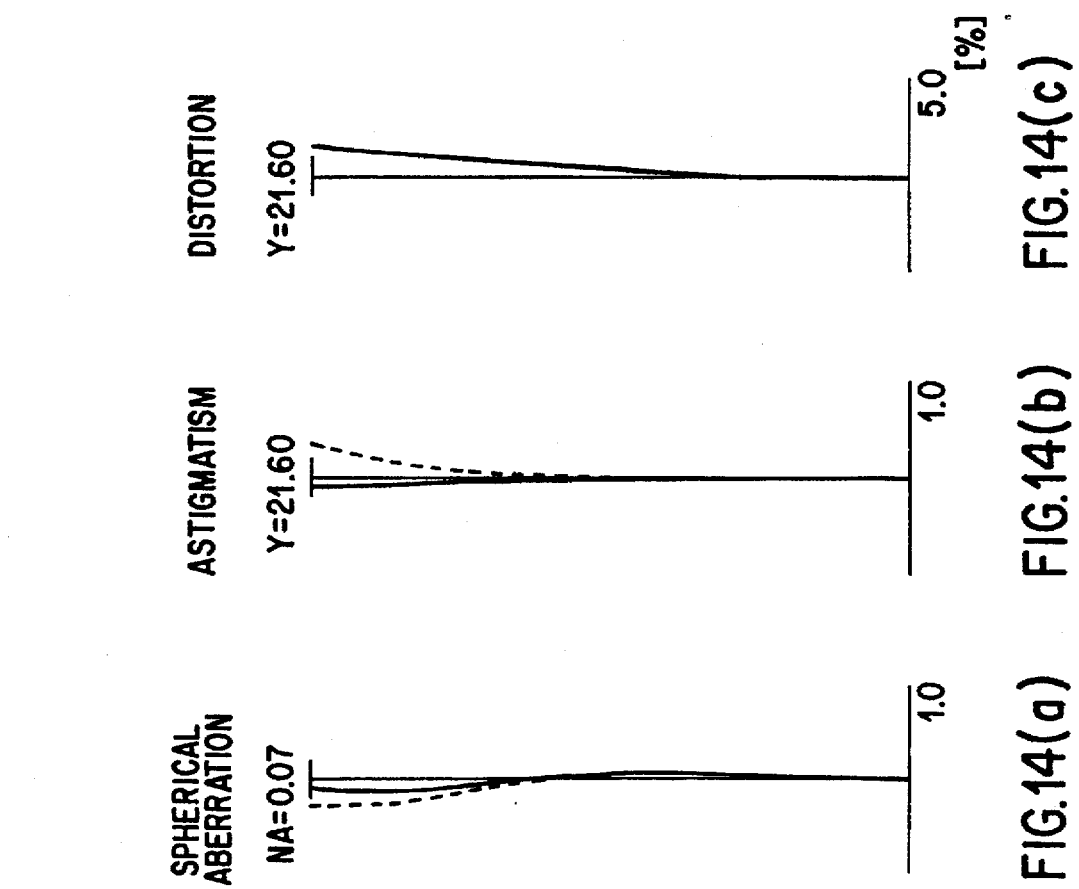
FIG.14(a) FIG.14(b) FIG.14(c) FIG.14(d)

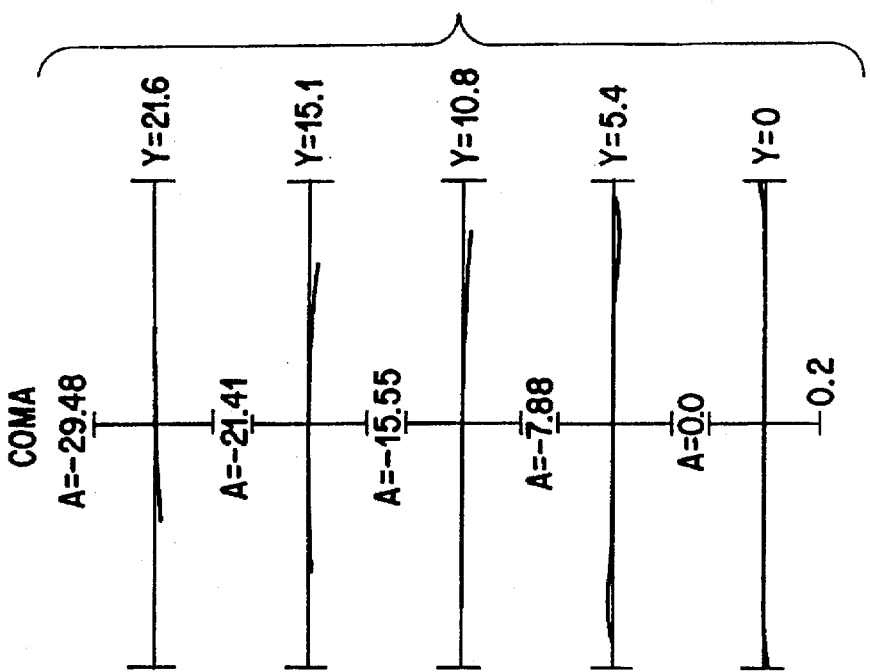
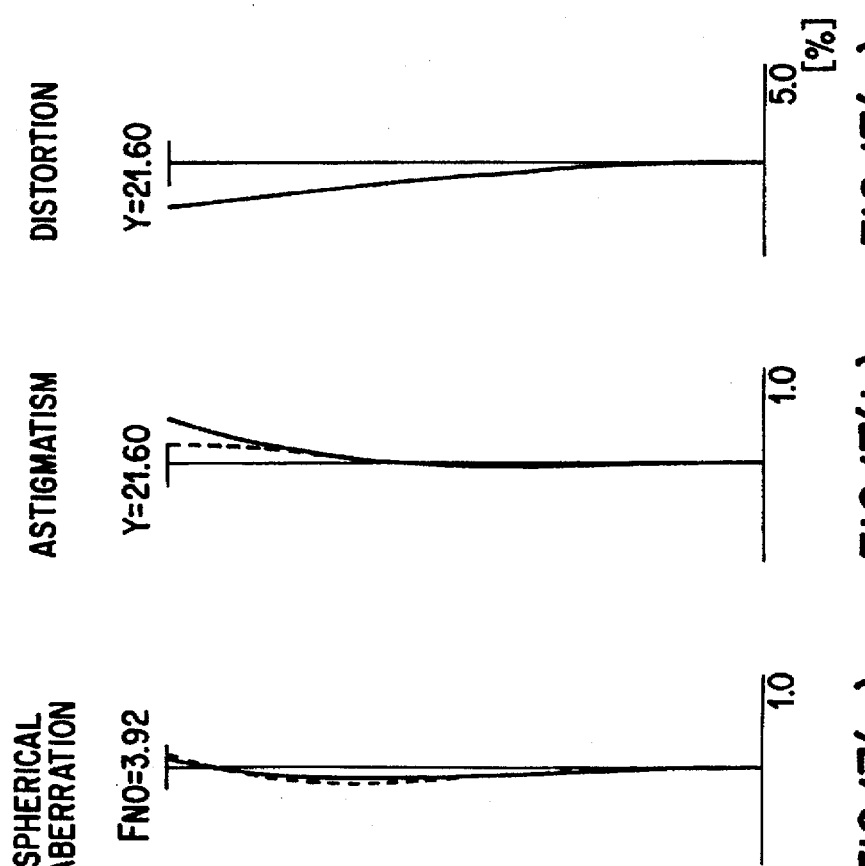

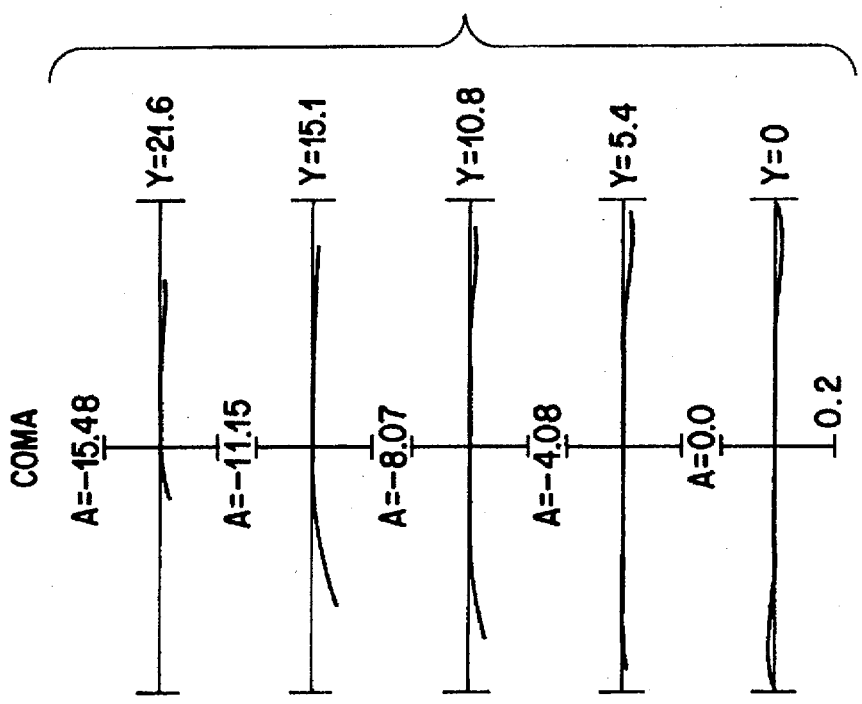
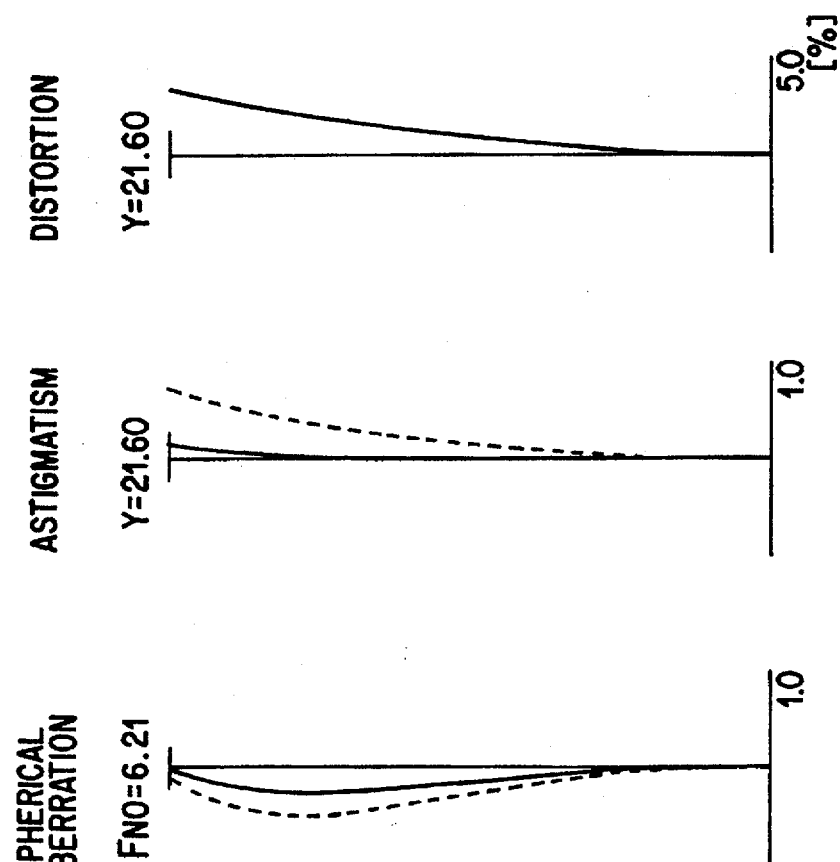

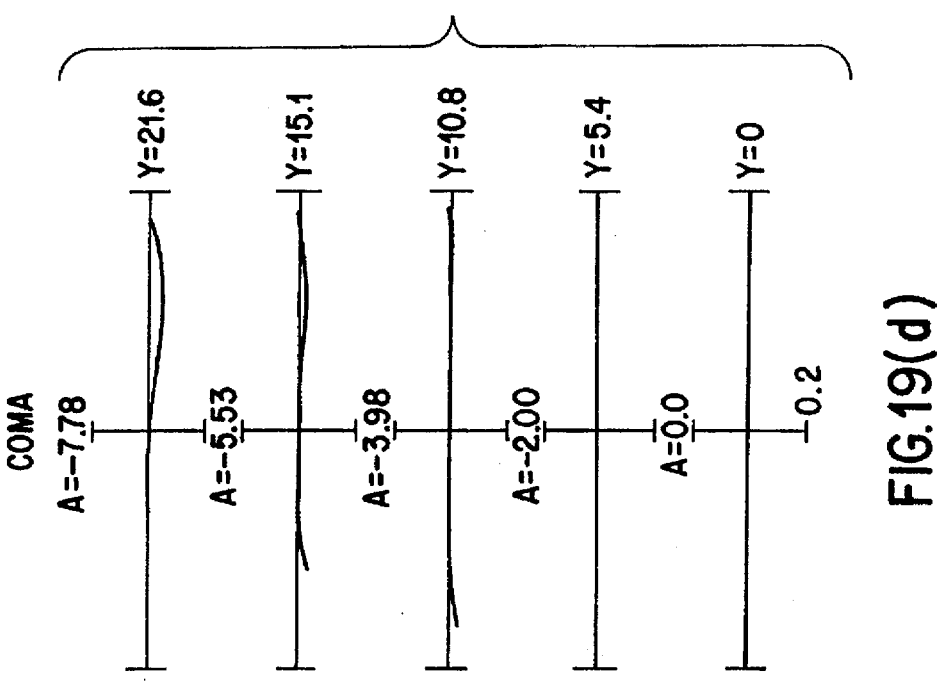
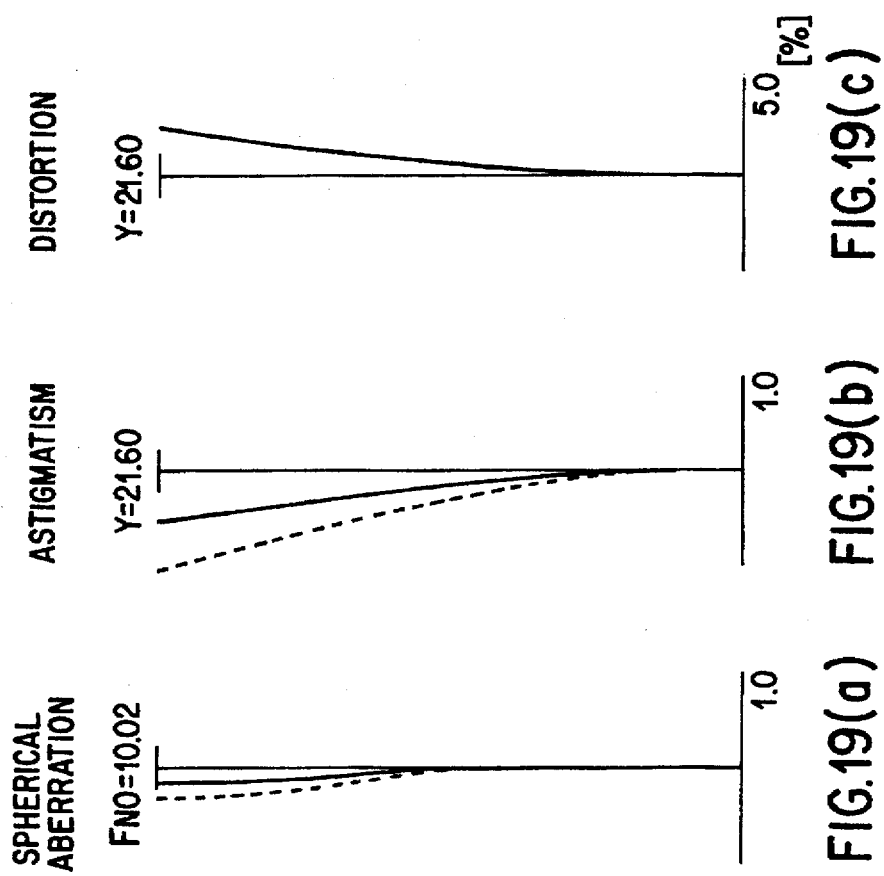
FIG.19(a) FIG.19(b) FIG.19(c) FIG.19(d)

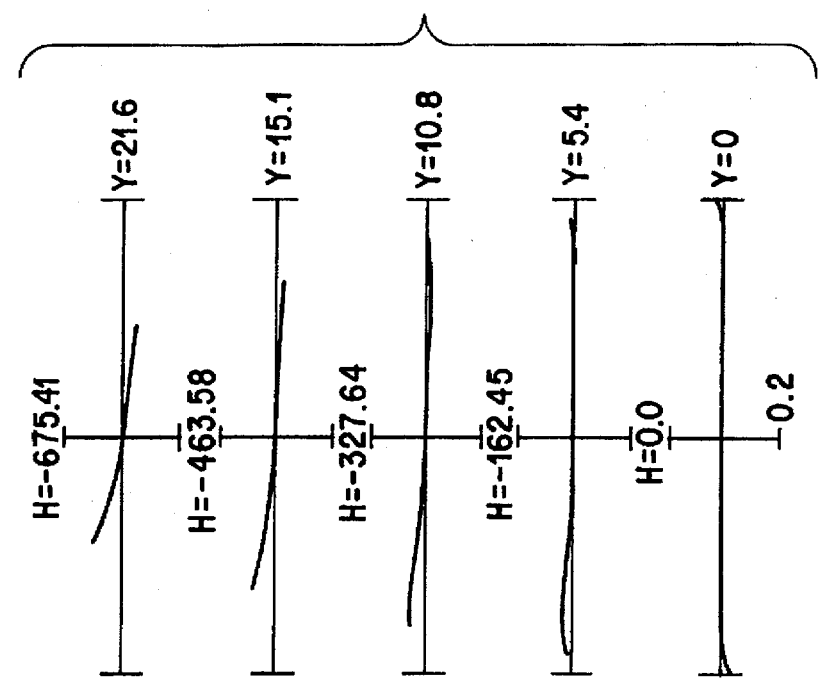
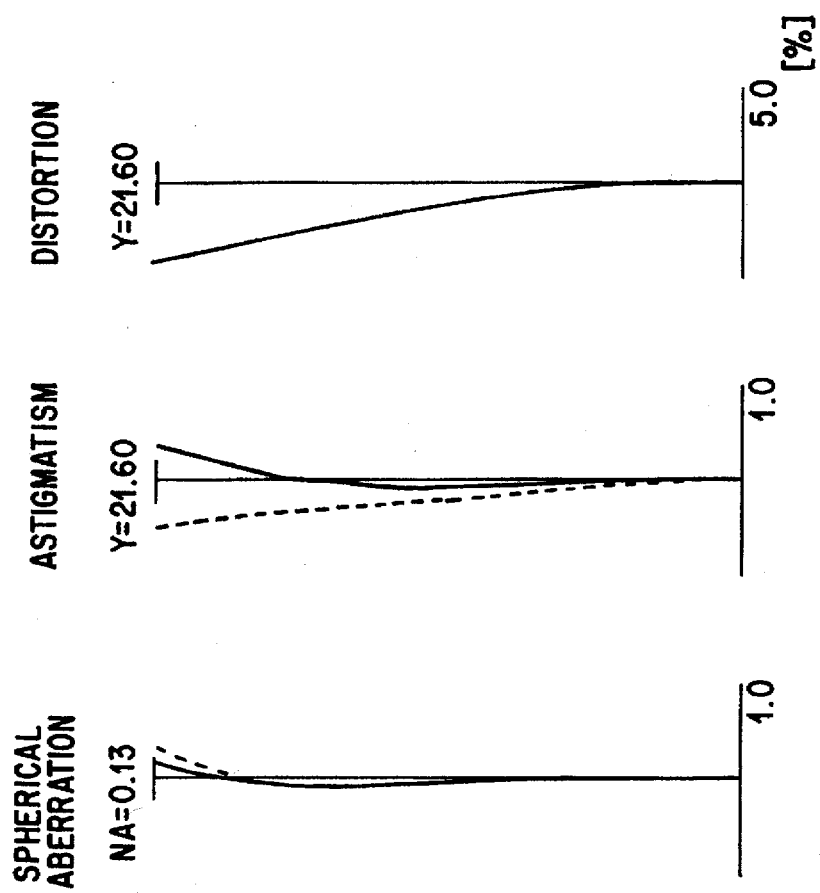
FIG.20(a) FIG.20(b) FIG.20(c) FIG.20(d)

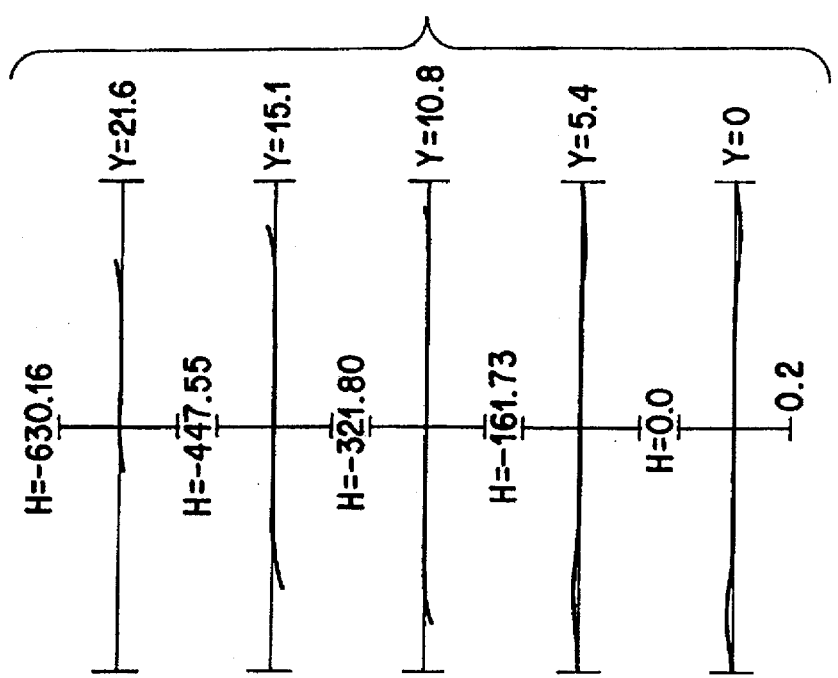
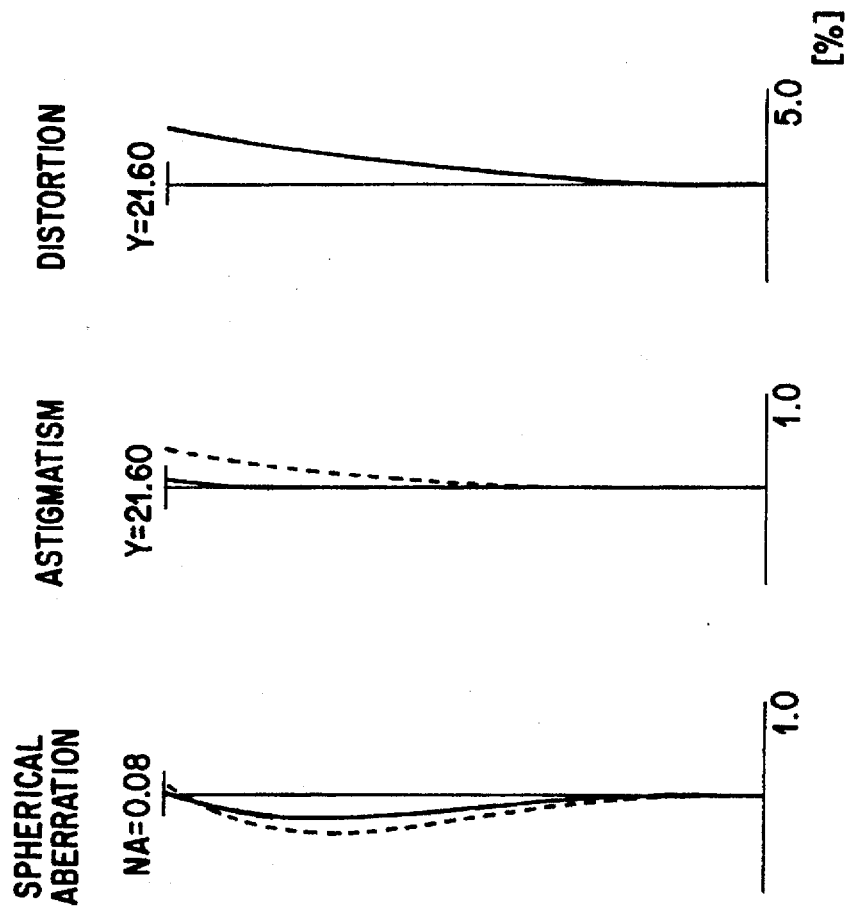
FIG. 21(a) FIG. 21(b) FIG. 21(c) FIG. 21(d)

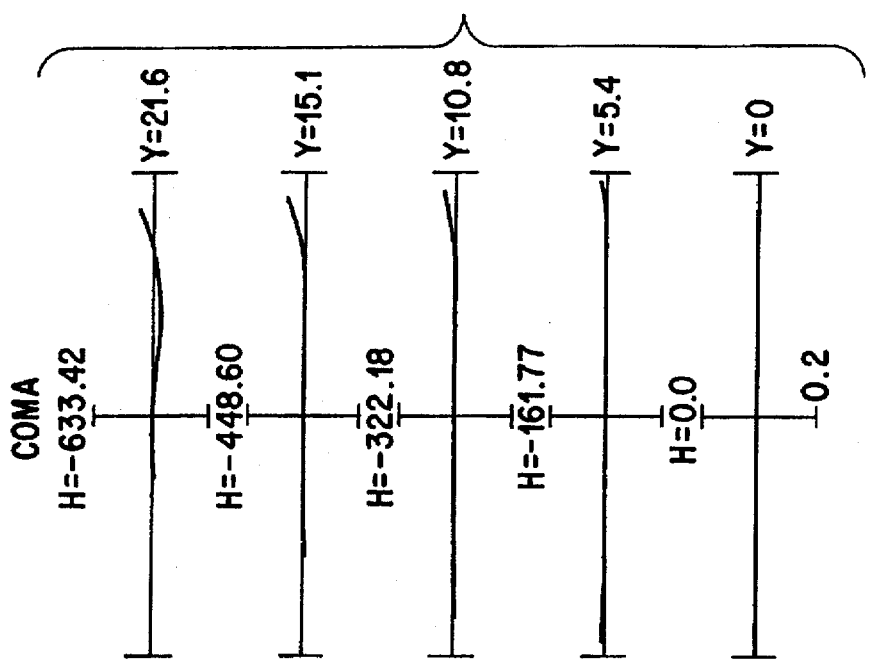
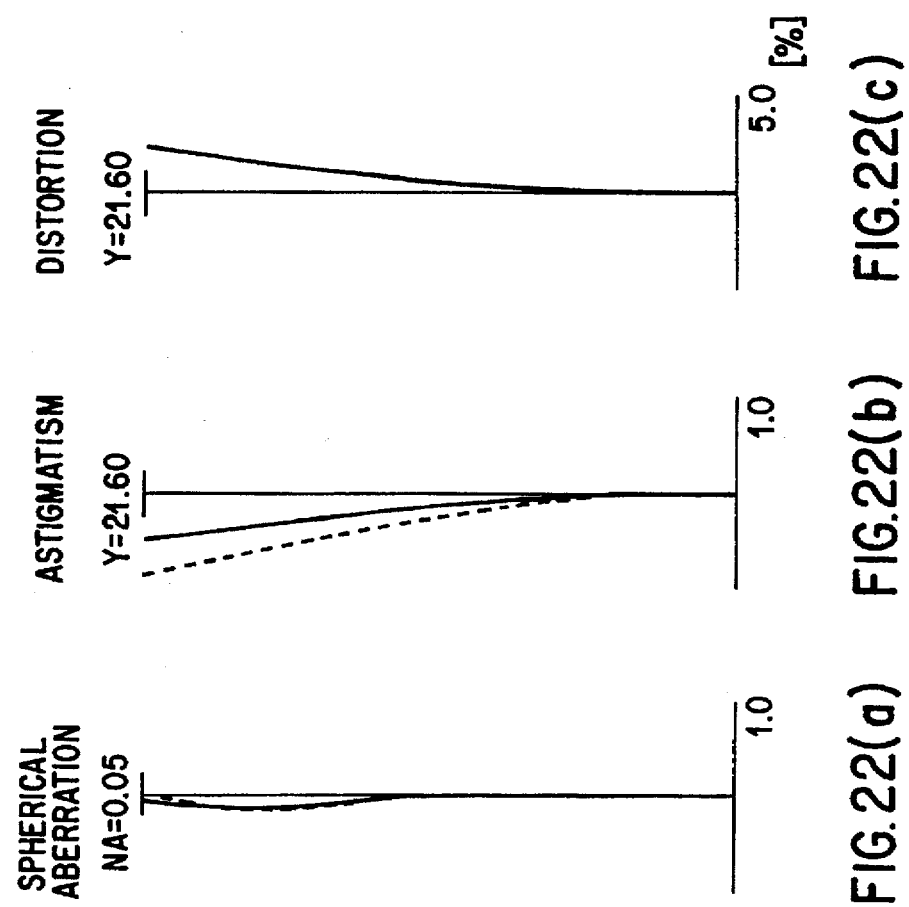
FIG. 22(a) SPHERICAL ABERRATION
FIG. 22(b) ASTIGMATISM
FIG. 22(c) DISTORTION
FIG. 22(d) COMA

ZOOM LENS CAPABLE OF FOCUSING ON CLOSE RANGE

BACKGROUND OF THE INVENTION

1. Field of the Invention

This invention relates to zoom lenses with short distance focusing.

2. Description of Related Art

In recent years, the zoom lens has become popular for cameras. Especially, zoom lenses with high zoom ratio, where the zoom ratio exceeds two, are coming into general use.

Additionally, zoom lenses with high zoom ratio using so-called multi-unit zoom lenses are increasingly being used. Such zoom lenses, using improved lens barrel technology, are constructed with more than three movable lens units.

When attempting to achieve high zoom ratios with a small number of moveable lens units, the fluctuations of the various aberrations during zooming cannot be controlled because the change in the lateral magnification of each lens unit for zooming gets larger.

In contrast, when the number of moveable lens units is greater, the contribution of each lens unit to the variable focal length can be made smaller because the change in the lateral magnification of every lens unit for zooming becomes small. Accordingly, high variable focal length and high performance can both be achieved.

Also, as auto-focus cameras become common, focusing methods appropriate for auto-focus lens systems have been suggested.

A zoom lens for a camera with auto-focus capability requires 1) a small movement of the focusing lens unit focused on an object at the closest distance from infinite, and 2) that the work load, that is, the movement amount multiplied by the weight of the focusing lens unit at the time of the focusing, be small.

As follows, methods to focus on the object at close range by moving one lens unit of the lens system are known.

(A) The front focusing (FF) method.

(B) The inner focusing (IF) method.

(C) The rear focusing (RF) method.

The first unit focusing method of (A) has the characteristic that the displacement amount for focusing at predetermined photographic distance is not variable during zooming. However, because the first lens unit is farthest from the image plane, the lens diameter in the first lens unit must be large, which makes the first lens unit less suitable for focusing.

In a multi-unit zoom lens, it is difficult to reduce costs because of the complexity of the lens barrel structure, and it is difficult to simplify the lens barrel while achieving high zoom ratios and high performance.

Additionally, for zoom lenses that perform short distance focusing by the inner focusing method and the rear focusing method, when the movement amount of short distance focusing of the focusing lens unit is large, the lens system also becomes large in order to provide the space for focusing movement of the focusing lens unit.

SUMMARY OF THE INVENTION

In view of the above problems, it is an object of the present invention to provide a small zoom lens with a high zoom ratio and high performance that makes possible short distance focusing with a simple lens barrel structure.

In order to achieve the above and other objectives, a zoom lens of the present invention that makes possible short distance focusing is provided with a focusing second lens unit that moves along the optical axis toward the short distance object during focusing; a first lens unit adjacent to and on the object side of the focusing second lens unit; and a third lens unit adjacent to and on the image side of the focusing second lens unit. Additionally, a zoom lens of the present invention satisfies the following conditions: (i) the first and the third lens units move integrally during zooming from the maximum wide-angle state to the maximum telephoto state; (ii) the focusing second lens unit moves in conjunction and relative to the first and third lens units during zooming; (iii) one of either the first or third lens units has a positive focal length and the other lens unit has a negative focal length; and (iv) when the focal length of the first lens unit is fa and the focal length of the third lens unit is fb, the following condition (1) is satisfied:

$$-0.6 < \frac{(fa+fb)}{(fa-fb)} < 0.4 \tag{1}$$

Condition (1) balances the focal length of the first lens unit and the focal length of the third lens unit.

According to a preferred embodiment of the present invention, at the maximum wide-angle state of focusing lens unit, the lateral magnification $\beta sw$ satisfies the following condition:

$$(\beta sw - \beta sw^{-1})^{-2} < 0.65 \tag{2}$$

Before discussing conditions (1) and (2), an explanation regarding the general auto-focusing method of a camera will be given.

With auto-focusing methods generally, focusing is performed by a driving device moving the focusing lens unit a movement amount calculated by a calculation device based on information regarding the object position or on information regarding the defocus amount of the image plane position.

Methods of driving the focusing lens along a mechanical cam path or based on electrical output using a so-called electronic cam are well known.

With zoom lenses that perform focusing using the aforementioned inner focus (IF) method or the rear focus (RF) method, the lateral magnification of the focusing lens unit changes with changing focal length of the lens system. Accordingly, the focusing movement amount for a particular photographic distance inadvertently also changes in association with changes in the lateral magnification of the focusing lens unit. Therefore, if the focusing lens unit is moved along a mechanical cam path, control of the movement of the focusing lens becomes difficult.

Accordingly, the method where the focusing lens unit is moved using an electronic cam is more suited to focusing using the inner focus (IF) method and the rear focus (RF) method.

FIG. 1 is a cross-sectional view of a zoom lens for explaining technical aspects of the present invention including part of the lens barrel structure.

With reference to FIG. 1, first lens unit Ga is adjacent to and on the object side (the left side in the FIG. 1) of the focusing second lens unit Gs, and the third lens unit Gb is adjacent to and on the image side (the right side in FIG. 1) of the focusing second lens unit Gs.

The focusing second lens unit Gs is held within a lens mount F, and is driven by a focusing lens unit driving member C. Additionally, the first lens unit Ga is held within a lens mount A, and the third lens unit Gb is held within a mount B.

Next, with a reference to FIG. 2, an explanation using a thin lens system which is able to approximate zero lens thickness will be given concerning how the lens units Ga and Gb contribute to the zooming operation. In the explanation provided hereafter, the first lens unit Ga has negative refractive power, focusing second lens unit Gs has positive refractive power, and the third lens unit Gb also has positive refractive power.

FIG. 2 shows the movement of the lens units Gs and Gb in conjunction to the lens group Ga that occurs during zooming from the maximum wide-angle state (W) to the maximum telephoto state (T).

FIG. 2 shows the relationship of the principal point positions of lens units of FIG. 1 at the maximum wide-angle state (W) and the maximum telephoto state (T). As shown in FIG. 2, in the maximum wide-angle state, the lens unit Gs and the lens unit Gb are very close; and in the maximum telephoto state, the lens unit Ga and the lens unit Gs are very close. Additionally, during zooming from the maximum wide-angle state to the maximum telephoto state, the lens unit Ga and the lens unit Gb move integrally together.

When the refractive power of the lens unit Ga is $\phi a$, the refractive power of the focusing lens unit Gs is $\phi f$, the refractive power of the lens unit Gb is $\phi b$, and the principal points spacing between the lens group Ga and the lens group Gb is d, the combined refractive power $\phi w$ of the zoom lens units Ga to Gb at the maximum wide-angle state is given by formula (a) that follows.

$$\phi w = \phi a + (\phi f + \phi b) - \phi a \cdot (\phi f + \phi b) \cdot d \quad (a)$$

Meanwhile, the combined refractive power $\phi t$ of the zoom lens units Ga to Gb at the maximum telephoto state is given by formula (b) that follows.

$$\phi t = (\phi a + \phi f) + \phi b - (\phi a + \phi f) \cdot \phi b \cdot d \quad (b)$$

Moreover, because $\phi f > 0$, the following relationships (c) to (e) exist.

$$|\phi a| > \phi a + \phi f \quad (c)$$

$$\phi b < (\phi f + \phi b) \quad (d)$$

$$\phi t - \phi w = \{-(\phi a + \phi f) \cdot \phi b + \phi a \cdot (\phi f + \phi b)\} \cdot d \quad (e)$$

Formulae (c) to (e) show that $\phi w$ is larger that $\phi t$, and also shows how the various lens units contribute to the changes in focal length.

When the refractive power $\phi f$ of the focusing lens group Gs is negative, rather than positive, the focusing lens unit Gs is reversed from that shown in FIG. 2 when changing from the maximum wide-angle state to the maximum telephoto state. Additionally, when lens unit Ga has positive refractive power and lens unit Gb has negative refractive power, the same type of movement is required, as can be understood by considering FIG. 2 with the direction of the light path reversed.

Next, a condition for reducing the amount of movement of the lens unit Gs for performing focusing will be explained.

When an object moves closer, focusing on the short distant object can be performed by moving the focusing lens unit Gs so that the position of the object point by way of the first lens unit Ga and the focusing lens group Gs which is on the object side of the lens group Gb, is fixed. The condition in order to reduce the focusing movement amount $\Delta$ of the lens group Gs at that instance, will be explained using the thin lens system shown in FIG. 3.

With reference to FIG. 3, F shows the position of the focusing lens unit Gs at the infinite focus state, and F' shows the position of the focusing lens unit Gs at the short distance focus state. Furthermore, A shows the position of the object point that is imaged by the focusing lens unit Gs at the infinite focus state, that is, the position of the virtual image point formed by the first lens unit Ga, and B shows the position of the image point imaged by the focusing lens group Gs, that is, the position of the object point as imaged to the lens unit Gb.

In addition, A' shows the object position as imaged to the focusing lens unit Gs at the short distance focus state. As shown in FIG. 3, when the object position moves from the infinite focus state to close range focus state, short distance focusing is performed by the focusing lens unit Gs moving along the optical axis only the amount $\Delta$ so that the position B of the object point image for the lens unit Gb remains fixed.

As explained above and shown in FIG. 3, when the position of the image point serving as an object point for the focusing lens group Gs moves a small amount d, the focusing lens unit Gs moves a small amount $\Delta$ in order to maintain the position B of the object point for lens unit Gb fixed. In that case, when the magnification of the lens unit Gs is $\beta f$, the movement amount $\Delta$ of the focusing lens unit Gs is given by the following formula (f).

$$\Delta = [\beta f^2/(\beta f^2 - 1)] \cdot d \quad (f)$$

With formula (f), if $k = \beta f^2/(\beta f^2 - 1)$, the value of k is dependent upon the value of $\beta f^2$ as shown by the following formulas (g) and (h).

$$1 \leq k \text{ for } \beta f^2 > 1 \quad (g)$$

$$0 > k \text{ for } \beta f^2 < 1 \quad (h)$$

Accordingly, in order to reduce the movement amount $\Delta$ of the focusing lens unit Gs, for the case (g) above, k must approach 1 as closely as possible. That means that it is necessary for $1/\beta f$ to approach zero as closely as possible. For the case (h) above, k must approach zero as closely as possible, which means that it is necessary for $\beta f$ to approach zero. The present invention reduces the required movement amount $\Delta$ of the focusing lens unit Gs by using appropriate values of $\beta f$.

With reference to condition (1) above, when condition (1) is not satisfied, the focal length of lens unit Ga or the focal length of lens unit Gb is much larger than the focal length of the other lens unit, causing large fluctuations of various aberrations during zooming over a desired zoom range.

As described above, the focusing movement amount $\Delta$ of the lens unit Gs is shown by formula (f), and the focusing movement $\Delta$ of the lens group Gs can be made small by reducing k.

With regard to condition (2), condition (2) emphasizes the characteristic of this invention of reducing the focusing movement amount $\Delta$ of the lens unit Gs by reducing.

Where the upper value of the condition (2) is exceeded, the focusing movement amount of the lens unit Ga becomes large, which is undesirable.

Additionally, together with the reduction of the movement amount of lens unit Gs as compared to the lens unit Ga during zooming from the maximum wide-angle state to the maximum telephoto state, it is desirable in order to control the additional variable power effects that occur with the lens units Ga and Gb that the following condition (3) be satisfied:

$$0.8 < \frac{|fs|}{fg} < 5 \qquad (3)$$

where, fs=focal length of the focusing lens unit Gs, and fg:=combined focal length at the maximum wide-angle state of the lens units Ga to Gb. Thus condition (3) controls the focal length of the focusing lens unit Gs.

In the present invention, it is desirable that relative movement between lens unit Ga and focusing lens unit Gs when zooming and that focusing movement of the focusing lens unit Gs be performed by a single movement device. Accordingly, as described above, reduction of the focusing movement amount of focusing lens unit Gs is desirable. Also, when moving the focusing lens unit Gs by the same movement device used for focusing to perform zooming, reduction of the movement amount of the lens unit Gs required for zooming is also desirable.

The zoom ratio $\phi t/\phi w$ from the aforementioned formulas (a) and (b) is expressed by the following formula (i).

$$\phi t/\phi w = \frac{(a - \phi a \cdot \phi f \cdot d)}{(a - \phi b \cdot \phi f \cdot d)} \qquad (i)$$

where a in the formula (i) is expressed by the following formula (j).

$$a = \phi a + \phi b + \phi f - \phi a \cdot \phi b \cdot d \qquad (j)$$

In the present invention, the refractive power $\phi a$ of the lens unit Ga and the refractive power $\phi b$ of the lens unit Gb each have different signs. For this reason, the zoom ratio $\phi t/\phi w$ increases rapidly with changes in $\phi a$ and $\phi b$ if $|\phi f \cdot d|$ is large. That is, the ratio that describes the variable focal length of the lens units Ga to Gb increases rapidly.

Accordingly, in order for the lens units Ga and Gb to contribute much to the variable focal length while keeping the movement amount of the focusing lens group Gs small during zooming, it is necessary to increase the refractive power $\phi f$ the focusing lens unit Gs.

However, if the refractive power of the focusing lens unit Gs is made too strong, the aberrations due to the focusing lens unit Gs become so large that it is not possible to obtain high performance with a small number of lens units. Additionally, when increasing the number of components in order to obtain high performance, the weight of the focusing lens unit Gs increases, and it is no longer suitable for focusing.

Accordingly, it is desirable to not make the focal length of the focusing lens unit Gs too small.

When the upper value of the condition (3) is exceeded, the contribution to the variable focal length of the lens units Ga and Gb decreases. The result is that when attempting to obtain the desired zoom ratio, the contribution to the variable power of the focusing lens becomes too large, and it is no longer possible to prevent large fluctuations of various aberrations during zooming.

Conversely, for the case where the lower value of condition (3) is exceeded, it is no longer possible to prevent large fluctuations of various aberrations during zooming with the focusing lens group Gs.

However, previously, for a lens-shutter type camera, the most common method of auto-focus has been to drive the focusing lens unit according to the detected object position, where the object position is detected by applying principles of triangle range finding using a different optical system than the photographic lens system. Additionally, the focusing lens unit has been moved using an electronic cam. Accordingly, as described above, the present invention can be readily introduced into lens-shutter type cameras for high performance short distance focusing.

In the lens-shutter type camera, the negative lens unit is positioned as near as possible to the image plane because it is desirable to shorten the total length of the lens system.

If the back focus at the maximum wide-angle state is shortened, the off-axis ray which passes through the negative lens unit which is as near as possible to the image plane separates from the optical axis which makes easier correction of the coma with fluctuations that occur with the change in the focal length and the angle of view. However, when the back focus at the maximum wide-angle state is shortened, a problem occurs of shadow images of dust particles on the lens surface on the farthest image side being recorded at the film surface. Additionally, if the off-axis ray that passes through the negative lens unit that is as near as possible to the image plane separates from the optical axis too much, then the lens diameter must increase. Therefore, it is desirable that the back focus at the maximum wide-angle state not be too small.

Accordingly, with the zoom lens which makes possible short distance focusing of the present invention into a lens-shutter type camera, it is desirable to place the negative lens unit as near as possible to the image plane, and to satisfy the following condition (4):

$$0.15 < Bfw/fw < 0.6 \qquad (4)$$

where

Bfw=back focus at the maximum wide-angle state, and fw=focal length of the entire lens system at the maximum wide-angle state.

As the upper value of condition (4) is exceeded, shortening the total length of the lens system cannot be achieved and the lens system increases in size.

Conversely, when the ratio of condition (4) is less than the lower value of condition (4), the off-axis ray that passes through the negative lens unit at the extreme image side separates too much from the optical axis. The result is that the diameter of the rearmost lens must increase to maintain a predetermined amount of light in the marginal zone.

Additionally, to further assure improved performance, it is desirable in condition (4) to increase the lower value to 0.2 or to increase the upper value to 0.45.

In the present invention, to simplify the lens barrel construction as well as to achieve high zoom ratios, it is desirable for the lens units Ga and Gb to have a combined positive focal length during zooming and for the focusing lens unit Gs to have a positive focal length.

Additionally, to decrease in the lens diameter, it is desirable for the aperture diaphragm to be adjacent to the focusing lens unit Gs or adjacent to either the lens units Ga and Gb and between them. In this way, by the aperture diaphragm being in the central portion of the lens system, decreased size of the lens system can be achieved.

Additionally, with the present invention, shifting of the image is possible by moving either multiple lens units, or a portion or entirety of one of the lens components of a lens unit of the zoom lens orthogonally to the optical axis. During that shifting, good performance can be maintained by compensating, as best as possible, for the image blur caused by fluctuations of the lens system.

BRIEF DESCRIPTION OF THE DRAWINGS

The invention has been previously described generally with reference to various figures and will be further described with reference to additional figures concerning specific embodiments, wherein:

FIGS. 6(a)–6(d) are graphs of spherical aberration, astigmatism, distortion and coma, respectively, at the infinite focus state with the maximum wide-angle state of the zoom lens of FIG. 4;

FIGS. 7(a)–7(d) are graphs of spherical aberration, astigmatism, distortion and coma, respectively, at the infinite focus state of the intermediate focal length state of the zoom lens of FIG. 4;

FIGS. 8(a)–8(d) are graphs of spherical aberration, astigmatism, distortion and coma, respectively, at the infinite focus state with the maximum telephoto state of the zoom lens of FIG. 4;

FIGS. 9(a)–9(d) are graphs of spherical aberration, astigmatism, distortion and coma, respectively, at the focus state of $-\frac{1}{30}$ photographic magnification with the maximum wide-angle state of the zoom lens of FIG. 4;

FIGS. 10(a)–10(d) are graphs of spherical aberration, astigmatism, distortion and coma, respectively, at the focus state of $-\frac{1}{30}$ photographic magnification with the intermediate focal length state of the zoom lens of FIG. 4;

FIGS. 11(a)–11(d) are graphs of spherical aberration, astigmatism, distortion and coma, respectively, at the focus state of $-\frac{1}{30}$ photographic magnification with the maximum telephoto state of the zoom lens of FIG. 4;

FIGS. 12(a)–12(d) are graphs of spherical aberration, astigmatism, distortion and coma, respectively, at the one meter photographic distance with the maximum wide-angle state of the zoom lens of FIG. 4;

FIGS. 13(a)–13(d) are graphs of spherical aberration, astigmatism, distortion and coma, respectively, at the one meter photographic distance with the intermediate focal length state of the zoom lens of FIG. 4;

FIGS. 14(a)–14(d) are graphs of spherical aberration, astigmatism, distortion and coma, respectively, at the one meter photographic distance with the maximum telephoto state of the zoom lens of FIG. 4;

FIGS. 17(a)–17(d) are graphs of spherical aberration, astigmatism, distortion and coma, respectively, at the infinite focus state with the maximum wide-angle state of the zoom lens of FIG. 15;

FIGS. 18(a)–18(d) are graphs of spherical aberration, astigmatism, distortion and coma, respectively, at the infinite focus state with the intermediate focal length state of the zoom lens of FIG. 15;

FIGS. 19(a)–19(d) are graphs of spherical aberration, astigmatism, distortion and coma, respectively, at the infinite focus state with the maximum telephoto state of the zoom lens of FIG. 15;

FIGS. 20(a)–20(d) are graphs of spherical aberration, astigmatism, distortion and coma, respectively, at the focus state of $-\frac{1}{30}$ photographic magnification with the maximum wide-angle state of the zoom lens of FIG. 15;

FIGS. 21(a)–21(d) are graphs of spherical aberration, astigmatism, distortion and coma, respectively, at the focus state of $-\frac{1}{30}$ photographic magnification with the intermediate focal length state of the zoom lens of FIG. 15; and FIGS. 22(a)–22(d) are graphs of spherical aberration, astigmatism, distortion and coma, respectively, at the focus state of $-\frac{1}{30}$ photographic magnification with the maximum telephoto state of the zoom lens of FIG. 15.

DETAILED DESCRIPTION OF PREFERRED EMBODIMENTS

Figure 1:
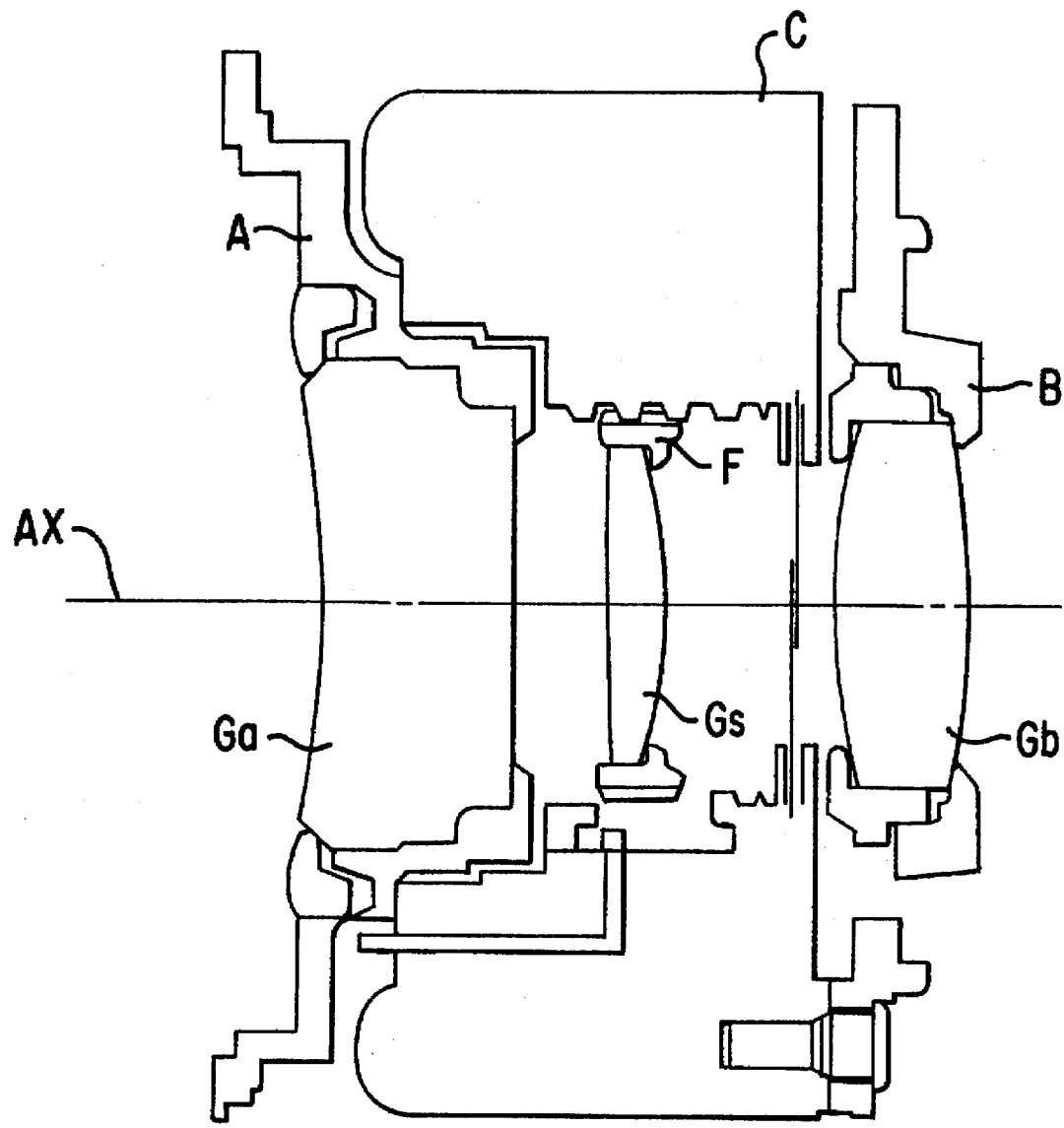
FIG. 1 is a cross-sectional view of a zoom lens, including the lens barrel structure, for explaining technical aspect of the present invention.
Figure 2:
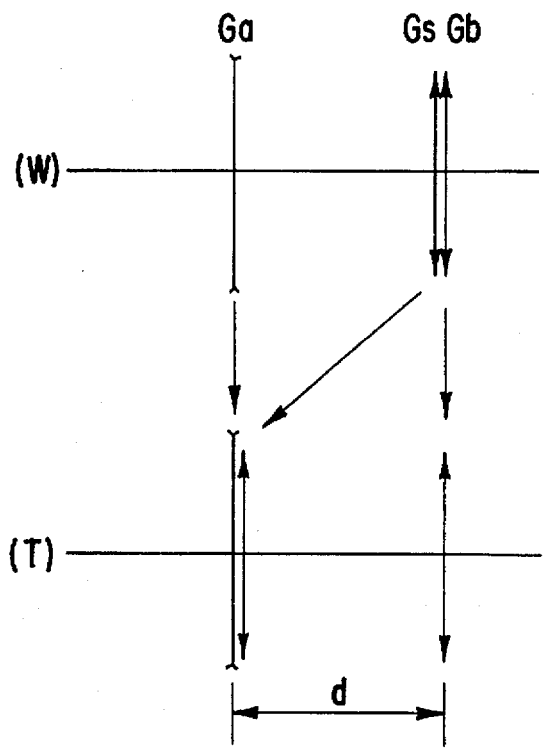
FIG. 2 shows the relationships of the lens units of the zoom lens of FIG. 1 at the maximum wide-angle state (W) and the maximum telephoto state (T) with the lens units illustrated as thin lenses.
Figure 3:
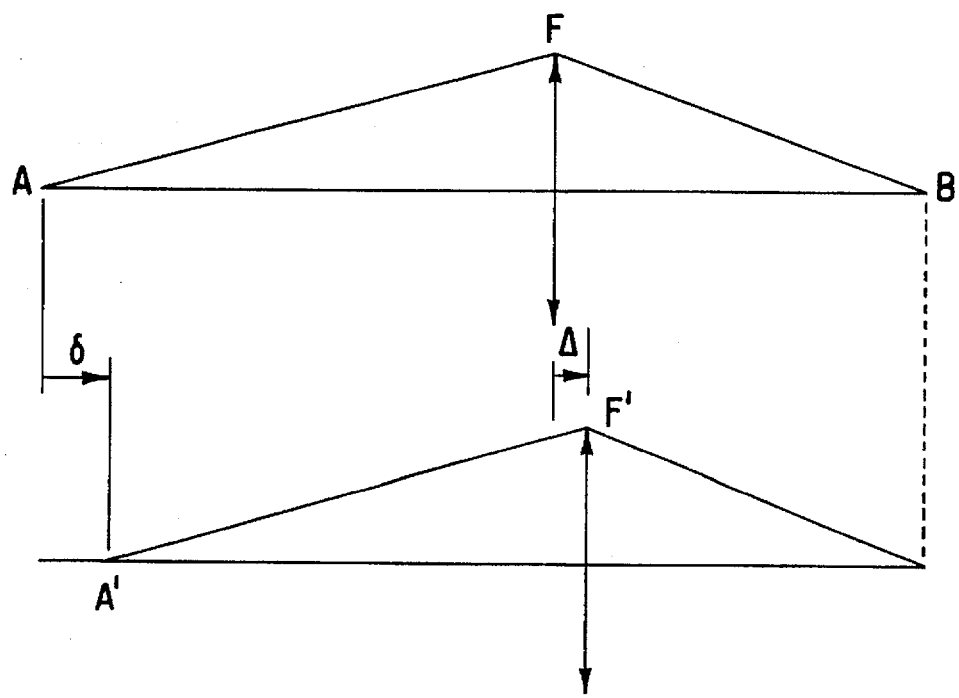
FIG. 3 shows the positions of the central lens unit of the zoom lens of FIG. 1 at infinite and short distance focus and its associated object and image points.
Figure 4:
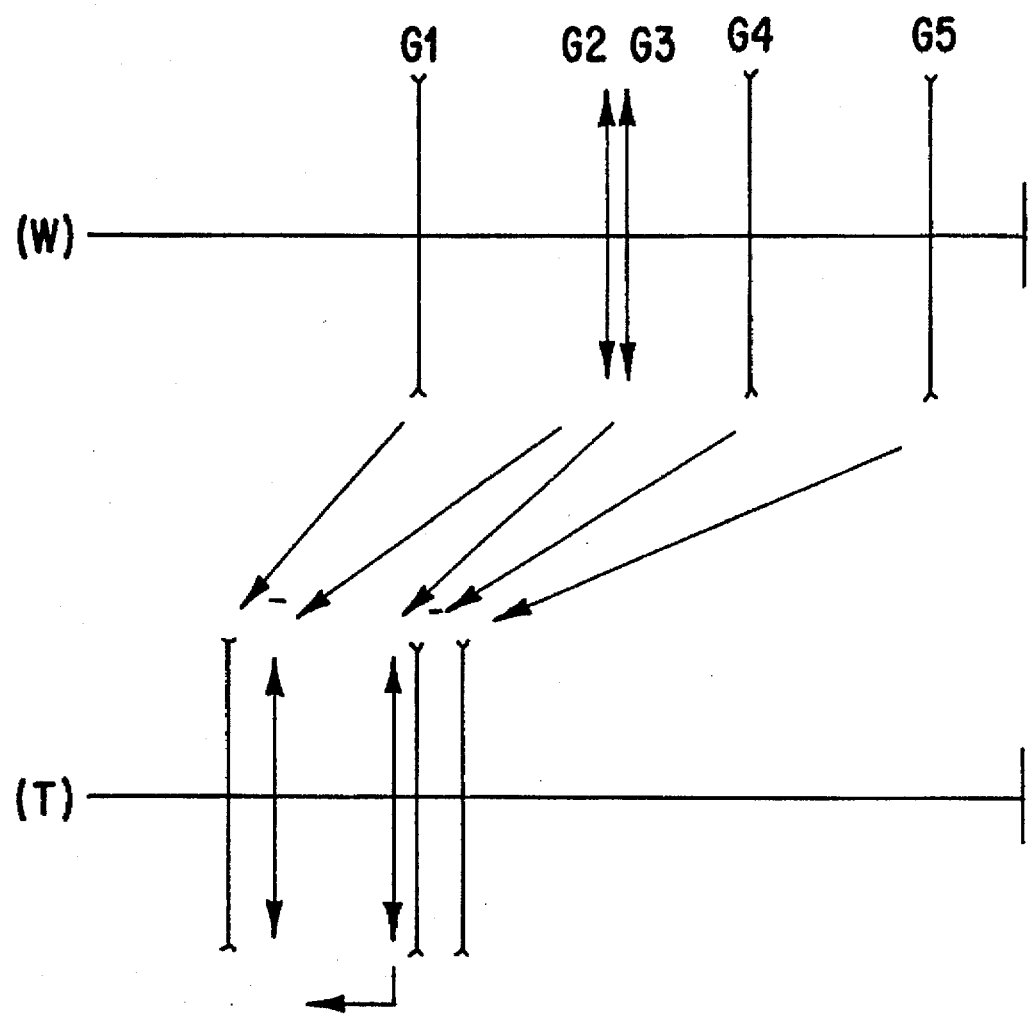
FIG. 4 is a schematic thin lens illustration of a zoom lens according to a first embodiment of the present invention at the maximum wide-angle (W) and telephoto (T) states.

FIG. 4 is a refractive power arrangement illustration of a zoom lens according to a first embodiment of the present invention at the maximum wide-angle (W) and telephoto (T) states.

The zoom lens of FIG. 4, in order from the object side, includes a negative refractive power first lens unit G1; a positive refractive power second lens unit G2; a positive refractive power third lens unit G3; a negative refractive power fourth lens unit G4; and a negative refractive power fifth lens unit G5. To vary the focal length from the maximum wide-angle state to the maximum telephoto state, each lens unit moves toward the object side so that the spacing between the first lens unit G1 and the second lens unit G2 is reduced, the spacing between the second lens unit G2 and the third lens unit G3 is increased, the spacing between the third lens unit G3 and the fourth lens unit G4 is reduced, and the spacing between the fourth lens unit G4 and the fifth lens unit G5 is reduced.

Lens units $G_2$, $G_3$ and $G_4$ correspond to lens units $G_a$, $G_s$ and $G_b$, respectively, previously described and their actual numbering in a multi-unit zoom lens would vary with the total number of lens units and their arrangement.

Figure 5:
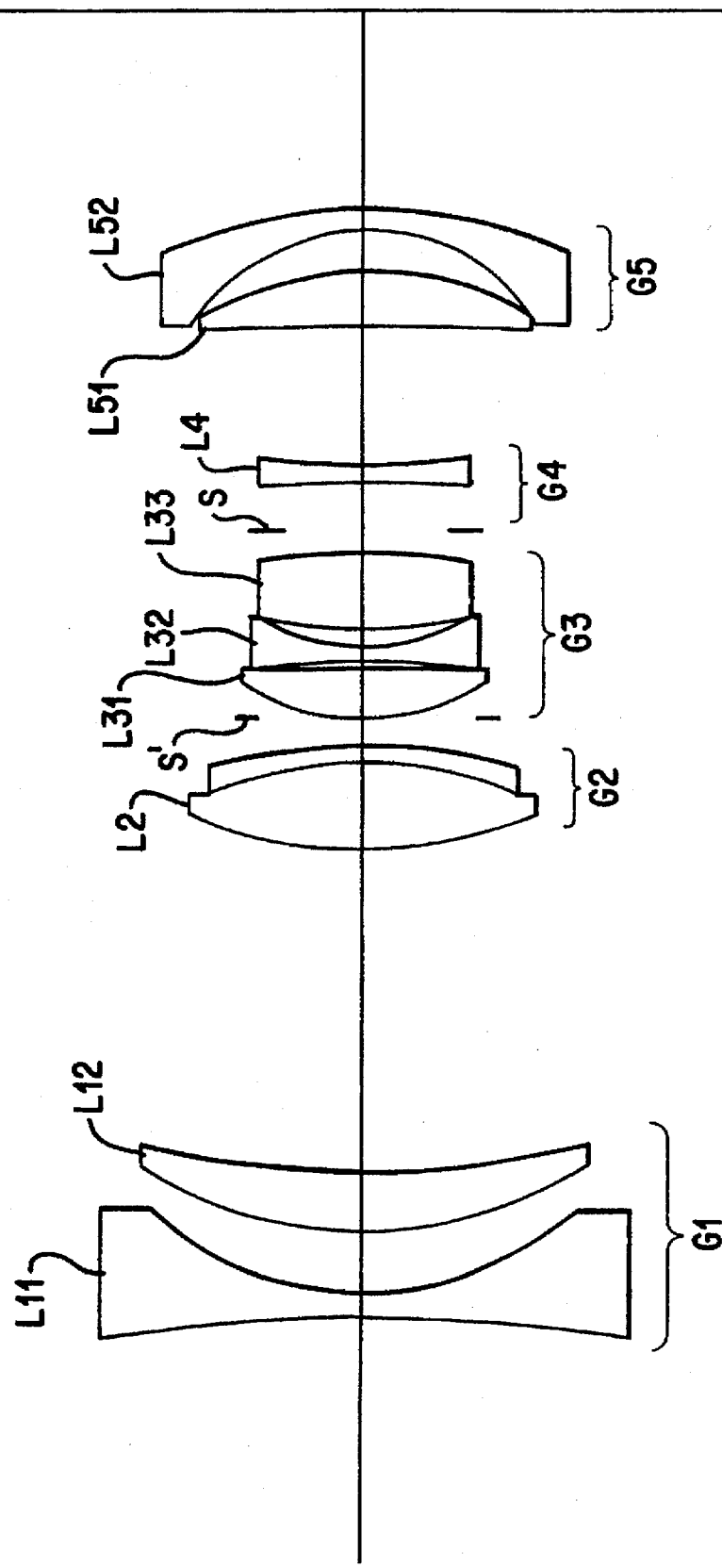
FIG. 5 is a cross-sectional view of the actual lens structure of the zoom lens of FIG. 4.

FIG. 5 is a cross-sectional view of the actual lens structure of the zoom lens of FIG. 4.

The zoom lens of FIG. 5, in order from the object side, includes the first lens unit G1 which consists of a biconcave lens L11 and a positive meniscus lens L12 with its convex surface facing the object side; the second lens unit G2 which consists of a biconvex lens L2 which is cemented to a negative meniscus lens with its concave surface facing the object side and the biconvex lens; the third lens unit G3 which consists of a positive meniscus lens L31 with its convex surface facing the object side, a biconcave lens L32, and a biconvex lens L33; the fourth lens unit G4 which consists of a biconcave lens L4; and the fifth lens group G5 which consists of a positive meniscus lens L51 with its concave surface facing the object side and a negative meniscus lens L52 with its concave surface facing the object side.

Moreover, an aperture diaphragm S is positioned between the third lens unit G3 and the fourth lens unit G4. Also, between the second lens unit G2 and the third lens unit G3, a fixed diaphragm S' is positioned.

FIG. 5 shows the positional relationship of each of the lens units in the maximum wide-angle state, and at the time of changing to the telephoto state, the lens units move on the optical axis along the zoom paths shown by the arrows in FIG. 4. Moreover, during zooming from the maximum wide-angle state to the maximum telephoto state, the second lens unit G2 and the fourth lens unit G4 move integrally together. Also, by moving the third lens unit G3 along the optical axis, focusing toward the short distance object is performed.

The values of various items of the first embodiment of this invention are shown in the following TABLE 1. In TABLE 1, f is the focal length, F NO is the F number, 2w is the full angle of view and Bf is the back focus. Additionally, the surface numbers indicates the order of the lens surfaces from the object side in the direction of the optical path, and the refractive index and the Abbe number are determined at the d line ($\lambda$=587.6 nm). The aperture ratio is defined by the F number (F NO) in the infinite focus state, and it is defined by the object side numerical aperture (NA) at the short distance focus state.

The shape of the aspheric surface is shown by the following equation (k), where y is the height of the perpendicular direction to the optical axis, S(y) is the displacement amount in the optical axis direction at the height y, r is the standard curvature radius (curvature radius at the peak), k is the conical constant, and $C_n$ is the aspheric surface constant of order n.

$$S(y)=(y^2/r)/[1+(1-k\cdot y^2/r^2)^{1/2}]+C_2\cdot y^2+C_4\cdot y^4+C_6\cdot y^6+C_8\cdot y^8+C_{10}\cdot y^{10} \quad (k)$$

Additionally, the paraxial radius of curvature R of the aspherical surface is defined by the following formula (m).

$$R=1/(2\cdot C_2+1/r) \quad (m)$$

A symbol * is placed next to the right side of the surface numbers for aspheric surfaces of TABLE 1.

The above definitions and symbols are also used to explain the second embodiment and its associated data which will be described later.

TABLE 1 f = 28.96~44.85~80.60 mm
F NO = 3.29~4.38~6.80
2w = 74.82~51.01~29.59°

| Surface Number | Radius of Curvature | Separation of Surfaces | Abbe Number | Refractive Index |
|---|---|---|---|---|
| 1 | −124.4490 | 1.408 | 43.35 | 1.84042 |
| 2 | 20.2060 | 3.712 | | |
| 3 | 24.4639 | 3.840 | 25350 | 1.80458 |
| 4 | 57.3825 | (d4 variable) | | |
| 5 | 28.1052 | 5.248 | 57.03 | 1.62280 |
| 6 | −25.5686 | 1.024 | 23.01 | 1.86074 |
| 7 | −41.6517 | (d7 variable) | | |
| 8 | ∞ | 0.000 | | (Aperture) diaphragm S') |
| 9 | 13.9771 | 2.944 | 57.53 | 1.67025 |
| 10 | 327.2562 | 0.512 | | |
| 11 | −85.7362 | 1.024 | 43.35 | 1.84042 |
| 12 | 14.3631 | 0.896 | | |
| 13* | 30.9573 | 4.864 | 60.64 | 1.63011 |
| 14 | −41.5855 | (d14 variable) | | |
| 15 | ∞ | 2.816 | | (Aperture) diaphragm S |
| 16 | −213.9843 | 1.152 | 49.45 | 1.77279 |
| 17 | 39.4519 | (d17 variable) | | |
| 18 | −793.4605 | 3.328 | 36.98 | 1.61293 |
| 19 | −21.9941 | 2.560 | | |
| 20 | −12.9057 | 1.280 | 49.45 | 1.77279 |
| 21 | −32.0379 | (bf) | | |

(Aspheric surface data)

| | k | $C_2$ | $C_4$ |
|---|---|---|---|
| Surface 13 | 1.0000 | 0.0000 | $-3.04756 \times 10^{-6}$ |

TABLE 1-continued

| $C_6$ | $C_8$ | $C_{10}$ |
|---|---|---|
| $1.56802 \times 10^{-7}$ | $-2.21107 \times 10^{-9}$ | $2.10253 \times 10^{-11}$ |

(Variable spacing for zooming)

| f | 28.9587 | 44.8513 | 80.5989 |
|---|---|---|---|
| d4 | 19.6515 | 9.7382 | 1.2800 |
| d7 | 1.6640 | 2.0480 | 2.4320 |
| d14 | 1.4080 | 1.0240 | 0.6400 |
| d17 | 8.2689 | 4.7129 | 2.4320 |
| Bf | 12.2343 | 26.1863 | 52.3914 |

(The focusing movement amount $\Delta$ of the third lens unit G3)

| focal length f | 28.9587 | 44.8513 | 80.5989 |
|---|---|---|---|
| $\Delta$ at the time of photographic magnification of −1/30 power | 0.4873 | 0.4833 | .4271 |
| $\Delta$ at the time of photographic distance of 1 m | 0.4555 | 0.7035 | 1.4444 |

(The sign of the focusing movement amount $\Delta$ toward the object side positive.)

[Values corresponding to conditions (1)–(4)]

| f1 = | −37.8266 |
|---|---|
| f2 = | +31.1479 |
| f3 = | +61.6240 |
| f4 = | −43.019 |
| f5 = | −175.6836 |
| fg = | +25.2979 |
| bsw = | 0.529 |
| (1) | (fa + fb)/(fa − fb) = −0.160 |
| (2) | (bsw − bsw$^{-1}$)$^{-2}$ = 0.540 |
| (3) | ¦ fs ¦/fg = 2.436 |
| (4) | Bfw/fw = 0.422 |

FIG. 6(a)–6(d) through FIG. 14(a)–3(d) are graphs of spherical aberration, astigmatism, distortion and coma, with respect to (a)–(d) of each numbered figure, at the d line ($\lambda$=587.6 nm) of the first embodiment.

FIGS. 6(a)–6(d) show the aberrations at infinite focus state with the maximum wide-angle state; FIGS. 7(a)–7(d) show the aberrations at the infinite focus state with the intermediate focal length state; FIGS. 8(a)–8(d) show the aberrations at the infinite focus state with the maximum telephoto state. Also, FIGS. 9(a)–9(d) show the aberrations at a focus state of −1/30 photographic magnification with the maximum wide-angle state; FIGS. 10(a)–10(d) show the aberrations at a focus state of −1/30 photographic magnification with the mid-way focal length state; and FIGS. 11(a)–11(d) show the aberrations at a focus state of −1/30 photographic magnification with the maximum telephoto state. Additionally, FIGS. 12(a)–12(d) show the aberrations at a one meter photographic distance with the maximum wide-angle state; FIGS. 13(a)–13(d) show the aberrations at a one meter photographic distance with the intermediate focal length state; and FIGS. 14(a)–14(d) show the aberrations at a one meter photographic distance with the maximum telephoto state.

In the graphs of aberrations, F NO indicates the F number; NA indicates the numerical aperture; Y indicates the image height; A indicates the angle of view according to each image height; and H indicates the object height according to each image height.

In addition, the solid lines in the graphs of astigmatism indicate the sagittal image plane and the broken lines indicate the meridional image plane. Also, the broken lines in the aberration graphs of spherical aberration indicates the sine condition.

As is apparent from the graphs of aberrations, aberrations are well corrected in the first embodiment at each focal length state and focusing distance.

Figure 15:
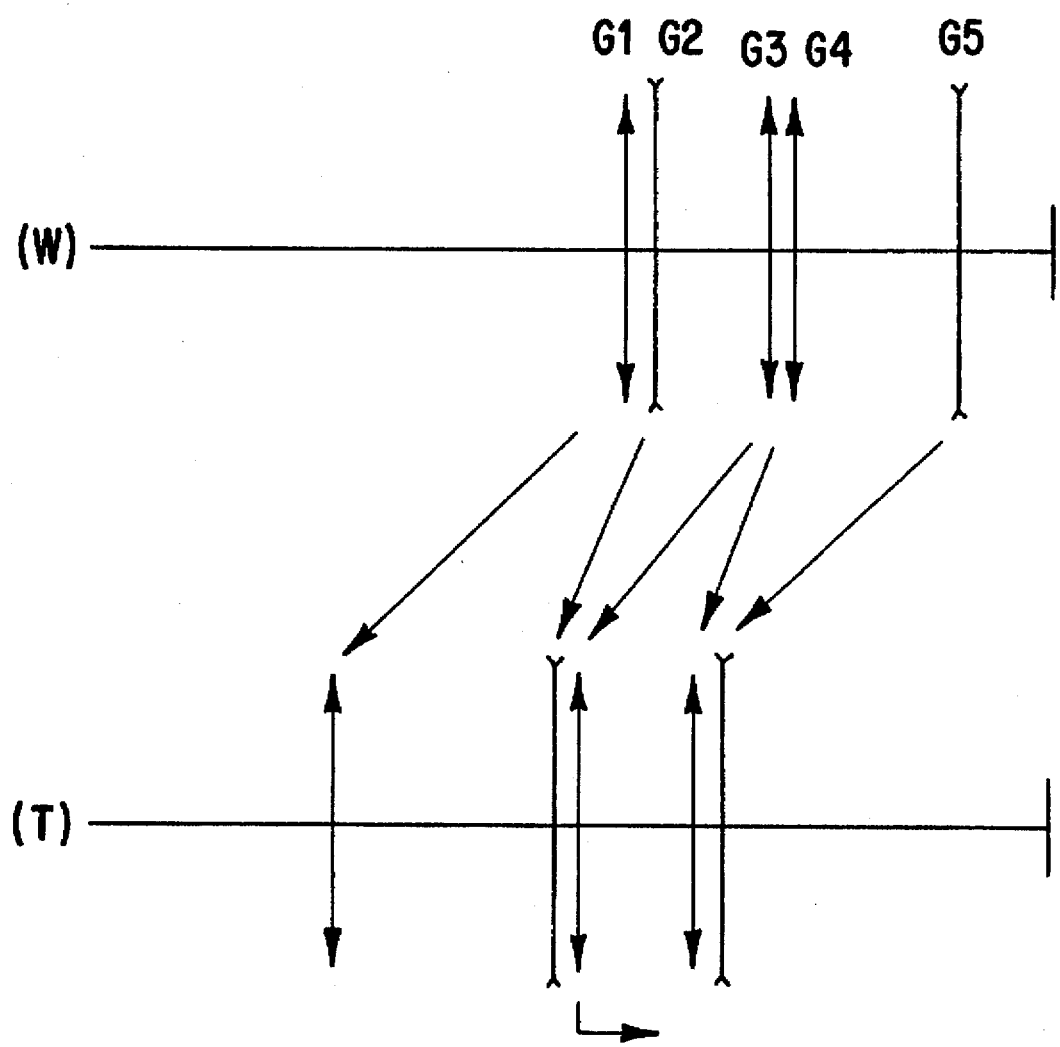
FIG. 15 is a schematic thin lens illustration of a zoom lens according to a second embodiment of the present invention at the maximum wide-angle (W) and telephoto (T) states.

FIG. 15 is a schematic thin lens illustration of a zoom lens according to a second embodiment of this invention.

The zoom lens of FIG. 15, in order from the object side, includes a positive refractive power first lens unit G1; a negative refractive power second lens unit G2; a positive refractive power third lens unit G3; a positive refractive power fourth lens unit G4; and a negative refractive power fifth lens unit G5. To vary the focal length from the maximum wide-angle state to the maximum telephoto state, each lens unit moves toward the object side so that the spacing between the first lens unit G1 and the second lens unit G2 increases, the spacing between the second lens unit G2 and the third lens unit G3 decreases, the spacing between the third lens unit G3 and the fourth lens unit G4 increases, and the spacing between the fourth lens unit G4 and the fifth lens unit G5 decreases.

Figure 16:
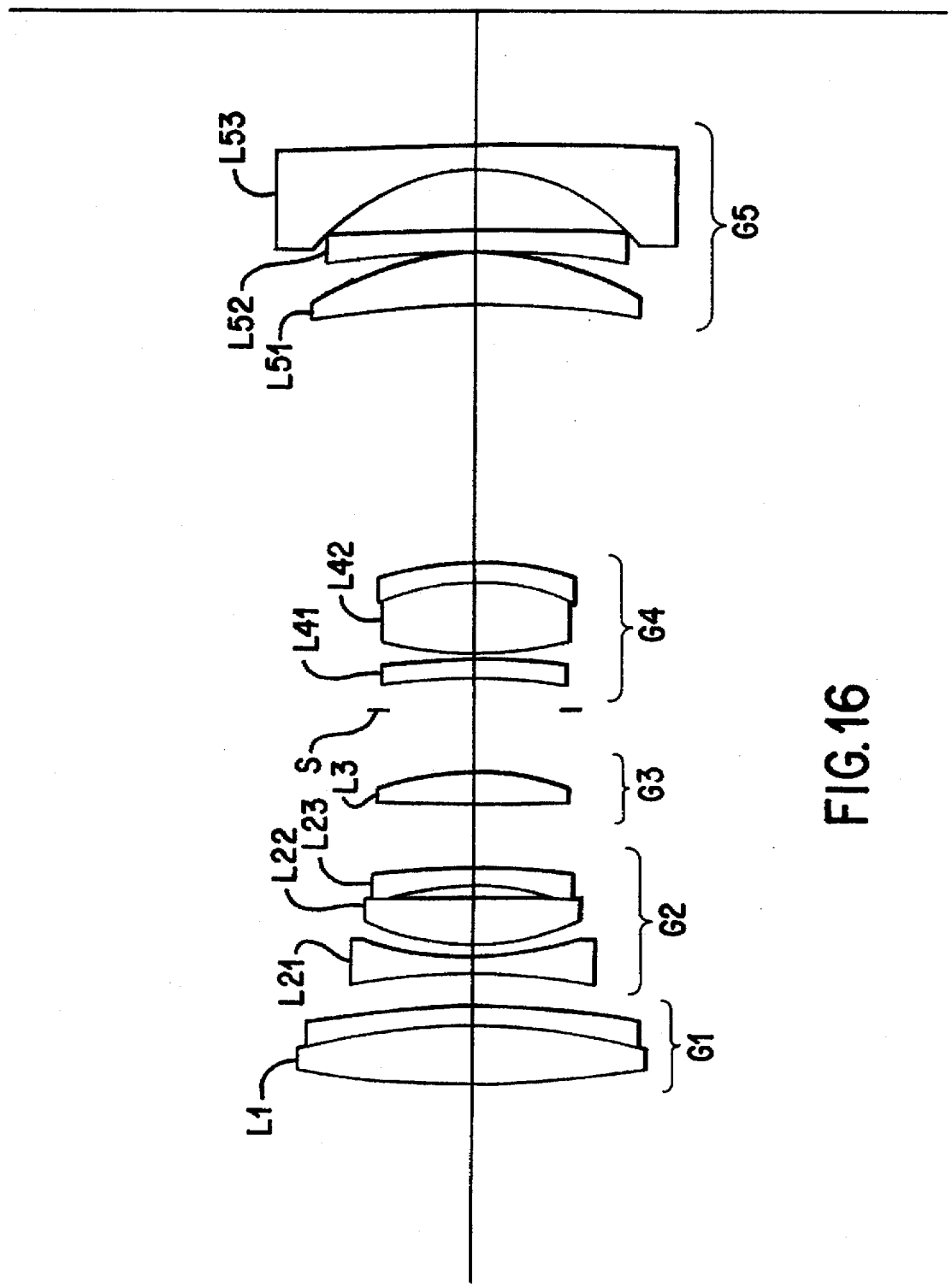
FIG. 16 is a cross-sectional view of the actual lens structure of the zoom lens of FIG. 15.

FIG. 16 is a cross-sectional view of the actual structure of the zoom lens of FIG. 15.

The zoom lens in FIG. 16, in order from the object side, includes the first lens unit G1 which consists of a biconvex lens L1 which is cemented to a negative meniscus lens with its concave surface facing the object side and the biconvex lens; the second lens unit G2 which consists of a biconcave lens L21, a biconvex lens L22, a negative meniscus lens L23 with its concave surface facing the object side; the third lens unit G3 which consists of a biconvex lens L3; and the fourth lens unit G4 which consists of a negative meniscus lens L41 with its concave surface facing the object side, a biconvex lens L42 which is cemented to a negative meniscus lens with its concave surface facing the object side and the biconvex lens; and the fifth lens unit G5 which consists of a positive meniscus lens L51 with its concave surface facing the object side, a negative meniscus lens L52 with its concave surface facing the object side, and a negative meniscus lens L53 with its concave surface facing the object side.

Moreover, an aperture diaphragm S is positioned between the third lens unit G3 and the fourth lens unit G4.

FIG. 16 shows the positional relationship of each lens units in the maximum wide-angle state, and at the time of variable power to the maximum telephoto state, they move on the optical axis along the zoom paths shown by the arrows in FIG. 15. Moreover, during zooming from the maximum wide-angle state to the maximum telephoto state, the second lens unit G2 and the fourth lens unit G4 move integrally. In addition, by moving the third lens unit G3 along the optical axis, focusing toward the short distance object is performed.

The values of various items of the second embodiment of this invention will be printed in the next TABLE 2. With TABLE 2, f is the focal length, F NO is the F number, $2w$ is the angle of view, and Bf is the back focus. In addition, the surface numbers indicate the order of the lens surfaces from the object side in direction of the optical path; and the refractive index and the Abbe number are determined at the d line ($\lambda$=587.6 nm). The aperture ratio is defined in the infinite focus state by the F number (F NO), and the short distance focus state by the object side numerical aperture (NA).

TABLE 2 f = 39.08~75.57~154.36 mm
F NO = 3.90~6.22~10.04
$2w$ = 58.96~30.97~15.56°

| Plane Number | Radius of Curvature | Separation of Surfaces | Abbe Number | Refractive Index |
|---|---|---|---|---|
| 1 | 73.9153 | 4.148 | 70.41 | 1.48749 |
| 2 | −41.6790 | 1.392 | 23.01 | 1.86074 |
| 3 | −63.9760 | (d3 variable) | | |
| 4 | −45.4062 | 1.139 | 45.37 | 1.79668 |
| 5 | 22.0493 | 0.886 | | |
| 6 | 18.6251 | 3.163 | 25.80 | 1.78472 |
| 7 | −1821.6338 | 1.012 | | |
| 8 | −19.2500 | 1.139 | 45.37 | 1.79668 |
| 9 | −76.9025 | (d9 variable) | | |
| 10 | 286.9010 | 2.151 | 64.10 | 1.51680 |
| 11 | −20.7474 | (d11 variable) | | |
| 12 | ∞ | 2.277 | | (Aperture diaphragm S) |
| 13* | −44.8063 | 1.265 | 30.24 | 1.58518 |
| 14 | −63.1809 | 0.380 | | |
| 15 | 25.3665 | 5.060 | 70.41 | 1.48749 |
| 16 | −15.9045 | 1.265 | 23.01 | 1.86074 |
| 17 | −24.9542 | (d17 variable) | | |
| 18 | −62.6021 | 3.163 | 25.50 | 1.80458 |
| 19 | −23.2612 | 0.253 | | |
| 20 | −76.7.89 | 1.265 | 45.37 | 1.79668 |
| 21 | −3485.2922 | 4.301 | | |
| 22 | −15.1395 | 1.518 | 49.45 | 1.77279 |
| 23 | −626.9579 | (Bf) | | |

(Aspheric surface data)

| | k | $C_2$ | $C_4$ |
|---|---|---|---|
| Plane 13 | 1.0000 | 0.0000 | −2.09410 × 10$^{-5}$ |
| | $C_6$ | $C_8$ | $C_{10}$ |
| | −3.98120 × 10$^{-8}$ | −1.59550 × 10$^{-9}$ | 9.57460 × 10$^{-12}$ |

(Variable spacing which occurs with variable focal length)

| f | 39.0812 | 75.5687 | 154.3565 |
|---|---|---|---|
| d3 | 2.1497 | 12.6428 | 25.1795 |
| d9 | 4.4376 | 2.4494 | 1.2640 |
| d11 | 4.1590 | 6.1472 | 7.3326 |
| d17 | 17.9465 | 10.0271 | 2.9123 |
| Bf | 9.1422 | 30.9642 | 70.6673 |

(The focusing movement amount Δ of the third lens unit G3)

| focal length f | 39.0812 | 75.5687 | 154.3565 |
|---|---|---|---|
| Δ at the time of photographic magnification of −1/30 power | 1.0495 | 0.7881 | 0.6907 |

(The sign of the focusing movement amount Δ toward the object side is positive.)
[Values corresponding to conditions (1)–(4)]

| f1 = | +90.6177 |
|---|---|
| f2 = | −23.6390 |
| f3 = | +37.5278 |
| f4 = | +37.6813 |
| f5 = | −28.2563 |
| fg = | +31.4034 |
| bsw = | −9.931 |
| (1) | (fa + fb)/(fa − fb) = −0.229 |
| (2) | (bsw − bsw$^{-1}$)$^{-2}$ = 0.101 |
| (3) | ¦ fs ¦/fg = 1.195 |
| (4) | Bfw/fw = 0.234 |

FIGS. 17(a)–17(d) through FIGS. 22(a)–22(b) are graphs of spherical aberration, astigmatism, distortion and coma, with respect to (a)–(d) of each numbered figure, at the d line ($\lambda$=587.6 nm) of the second embodiment.

FIGS. 17(a)–17(d) show the aberrations at the infinite focus state with the maximum wide-angle state; FIGS. 18(a)–18(d) show the aberrations at infinite focus state with the intermediate focal length state; and FIGS. 19(a)–19(d) show the aberrations at the infinite focus state with the maximum telephoto state. Also, FIGS. 20(a)–20(d) show the aberrations at the focus state of –1/30 photographic magnification with the maximum wide-angle state; FIGS. 21(a)–21(d) show the aberrations at the focus state of –1/30 photographic magnification with the middle focal length state; and FIGS. 22(a)–22(d) show the aberrations at the focus state of –1/30 photographic magnification with the maximum telephoto state.

In the graphs of aberrations, F NO indicates the F number; NA indicates the numerical aperture; Y indicates the image height; A indicates the angle of view according to each image height; and H indicates the object height according to each image height.

In addition, the solid lines in the graphs of astigmatism indicate the sagittal image plane, and the broken lines indicate the meridional image plane. Also, the broken lines in the graphs of spherical aberration indicates the sine condition.

As is apparent from each of the graphs of aberrations, aberrations are well corrected at each focal length state and focusing distance.

As explained above, according to the present invention zoom lens can be realized which makes possible short distance focusing with a simple lens barrel structure, a large zoom ratio and high performance.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A zoom lens capable of short distance focusing, comprising in order from an object side:

a first lens unit having a focal length fa that moves along the optical axis for zooming between a maximum wide-angle state and a maximum telephoto state, and that remains stationary during focusing;

a second lens unit that moves along the optical axis for focusing and that moves relatively to and in conjunction with the first lens unit during said zooming; and a third lens unit having a focal length fb that moves integrally with the first lens unit during said zooming, and that remains stationary during focusing, wherein the focal lengths of said first and third lens units are of opposite sign and satisfy the following condition:

$$-0.6 < \frac{(fa+fb)}{(fa-fb)} < 0.4.$$

2. The zoom lens of claim 1, wherein at the maximum wide-angle state of said zoom lens, the lateral magnification $\beta_{SW}$ of the second lens unit satisfies the following condition:

$$(\beta_{SW}-\beta_{SW}^{-1})^{-2} < 0.65.$$

3. The zoom lens of claim 1, wherein the zoom lens satisfies the following condition:

$$0.8 < \frac{|fs|}{fg} < 5$$

where
fs=focal length of the second lens unit, and
fg=combined focal length of the first, second, and third lens units at the maximum wide-angle state.

4. The zoom lens of claim 1, further comprising a fourth lens unit at the farthest image side of the zoom lens, and wherein the zoom lens satisfies the following condition:

$$0.15 < \frac{Bfw}{fw} < 0.6$$

where
Bfw=back focus of the zoom lens at the maximum wide-angle state of the zoom lens, and
fw=focal length of the entire zoom lens at the maximum wide-angle state of the zoom lens.

5. The zoom lens of claim 1, wherein the second lens unit has a positive focal length and the combined focal length of the first, second, and third lens units is positive throughout the zooming range between the maximum wide-angle state and the maximum telephoto state.

6. The zoom lens of claim 1, further including an aperture diaphragm arranged adjacent to at least one of the first lens unit, the second lens unit or the third lens unit.

7. The zoom lens of claim 1, wherein the first lens unit has a negative focal length and the third lens unit has a positive focal length.

8. The zoom lens of claim 1, wherein the first lens unit has a positive focal length and the third lens unit has a negative focal length.

9. The zoom lens of claim 1, further comprising a fourth lens unit on the object side of the first lens unit that moves in conjunction with and relative to the first lens unit during zooming between the maximum wide-angle state and the maximum telephoto state.

10. The zoom lens of claim 9, wherein the first, second, third and fourth lens units move in the same direction along the optical axis throughout zooming between the maximum wide-angle state and the maximum telephoto state.

11. The zoom lens of claim 10, wherein the second lens unit moves in said same direction to perform closer focusing.

12. The zoom lens of claim 10, wherein the second lens unit moves in the direction opposite to said same direction to perform closer focusing.

13. The zoom lens of claim 1, further comprising a fourth lens unit on the image side of the third lens unit that moves in conjunction with and relative to the third lens unit during zooming between the maximum wide-angle state and the maximum telephoto state.

14. The zoom lens of claim 13, wherein the first, second, third and fourth lens units move in the same direction along the optical axis throughout zooming between the maximum wide-angle state and the maximum telephoto state.

15. The zoom lens of claim 14, wherein the second lens unit moves in said same direction to perform closer focusing.

16. The zoom lens of claim 14, wherein the second lens unit moves in the direction opposite to said same direction to perform closer focusing.

17. The zoom lens of claim 1, further comprising:

a fourth lens unit on the object side of the first lens unit that moves in conjunction with and relative to the first lens unit during zooming between the maximum wide-angle state and the maximum telephoto state; and a fifth lens unit on the image side of the third lens unit that moves in conjunction with and relative to the third lens unit during zooming between the maximum wide-angle state and the maximum telephoto state.

18. The zoom lens of claim 17, wherein the first, second, third, fourth and fifth lens units move in the same direction along the optical axis throughout zooming between the maximum wide-angle state and the maximum telephoto state.

19. The zoom lens of claim 18, wherein the second lens unit moves in said same direction to perform closer focusing.

20. The zoom lens of claim 18, wherein the second lens unit moves in the direction opposite to said same direction to perform closer focusing.

21. A zoom lens capable of focusing at close range, comprising:

a first lens unit;

a second lens unit, positioned on the image side of the first lens unit; and a third lens unit, positioned on the image side of the first and second lens units, wherein the second lens unit moves along an optical axis for focusing and moves relatively to and in conjunction with the first and third lens units during zooming, the first and third lens units move integrally together during zooming and remain stationary during focusing and a focal length of the first lens unit fa and a focal length of the third lens unit fb are of opposite sign and satisfy the following condition:

$$-0.6 < \frac{(fa+fb)}{(fa-fb)} < 0.4.$$

22. The zoom lens of claim 21, further comprising an additional lens unit on the object side of the first lens unit.

23. The zoom lens of claim 21, further comprising an additional lens unit on the image side of the third lens unit.

24. The zoom lens of claim 21, wherein the second lens unit is between the first and third lens units.

* * * * *